United States Patent [19]
Sugiura

[11] Patent Number: 5,779,889
[45] Date of Patent: Jul. 14, 1998

[54] WASHING APPARATUS AND OILY WATER SEPARATION DEVICE AND FILTRATION DEVICE BEST SUITED TO WASHING APPARATUS

[76] Inventor: Eiichi Sugiura, 149, Matsumoto-cho, Hekinan-shi, Aichi-ken, Japan

[21] Appl. No.: 563,645

[22] PCT Filed: Mar. 31, 1995

[86] PCT No.: PCT/JP95/00634

§ 371 Date: Nov. 28, 1995

§ 102(e) Date: Nov. 28, 1995

[87] PCT Pub. No.: WO95/26797

PCT Pub. Date: Oct. 12, 1995

[30] Foreign Application Priority Data

| | | | |
|---|---|---|---|
| Mar. 31, 1994 | [JP] | Japan | 6-63172 |
| Oct. 13, 1994 | [JP] | Japan | 6-247949 |
| Dec. 8, 1994 | [JP] | Japan | 6-304945 |

[51] Int. Cl.⁶ .................................................. C02F 1/40
[52] U.S. Cl. .......................... 210/195.1; 210/257.1; 210/299; 210/411; 210/540; 210/DIG. 5
[58] Field of Search ........................ 210/411, 540, 210/194, 195.1, 257.1, 258, 259, 299, 521, DIG. 5

[56] References Cited

U.S. PATENT DOCUMENTS

| | | | |
|---|---|---|---|
| 4,053,414 | 10/1977 | in'T Veld | 210/DIG. 5 |
| 4,202,768 | 5/1980 | De Longe et al. | 210/411 |
| 4,240,908 | 12/1980 | Swain et al. | 210/DIG. 5 |
| 4,299,699 | 11/1981 | Boogay | 210/DIG. 5 |
| 4,309,289 | 1/1982 | Head | 210/DIG. 5 |
| 4,591,441 | 5/1986 | Sakai | 210/DIG. 5 |
| 4,888,117 | 12/1989 | Brown et al. | 210/DIG. 5 |
| 5,374,351 | 12/1994 | Bolton et al. | 210/411 |
| 5,468,385 | 11/1995 | Inoue | 210/DIG. 5 |

FOREIGN PATENT DOCUMENTS

| | | |
|---|---|---|
| 49-82178 | 8/1974 | Japan . |
| 50-153362 | 12/1975 | Japan . |
| 54-32869 | 3/1979 | Japan . |
| 55-44341 | 3/1980 | Japan . |
| 5-345173 | 12/1993 | Japan . |

*Primary Examiner*—Christopher Upton
*Attorney, Agent, or Firm*—Palmatier, Sjoquist, Voigt & Christensen, P.A.

[57] ABSTRACT

A washing apparatus includes a bubbling wash section for impinging bubbles in washing liquid to a material such as a machined work to be washed so as to remove solids such as sludges and oils adhered to the material to be washed, and a sludge removal and oily water separation section for removing sludges or the like mixed with the washing liquid at the bubbling wash section and for separating oily water in the washing liquid, the washing liquid passed through said sludge removal and oily water separation section being returned to the initial bubbling wash section for circulation. An activated carbon filtration section for connection with the bubbling wash section is optionally provided.

7 Claims, 15 Drawing Sheets

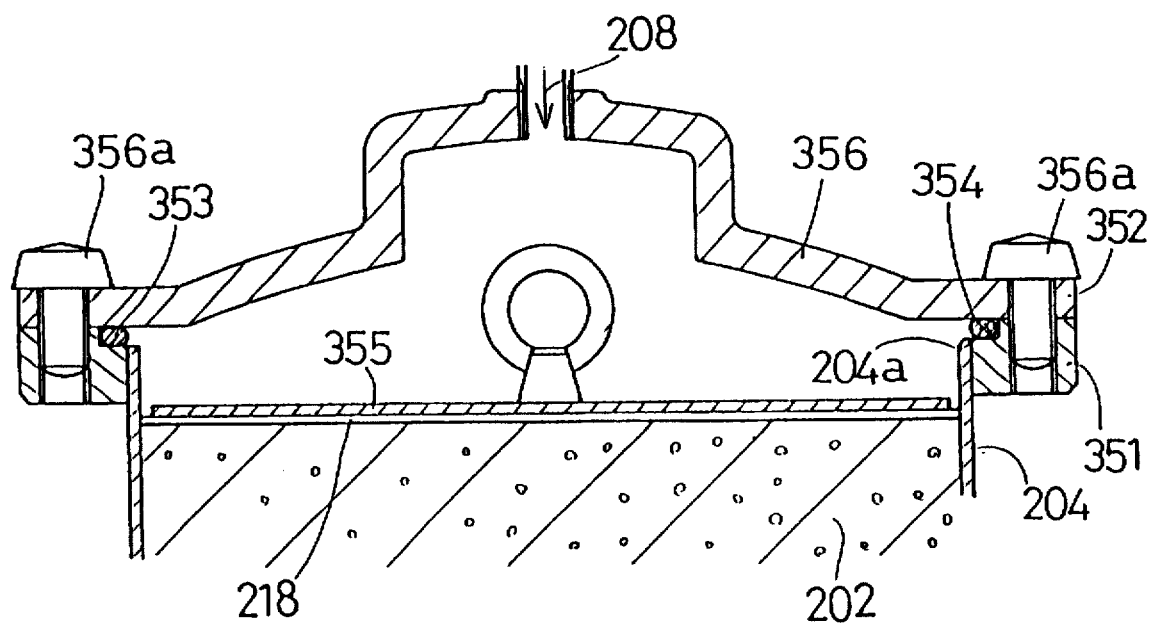
FIG.16
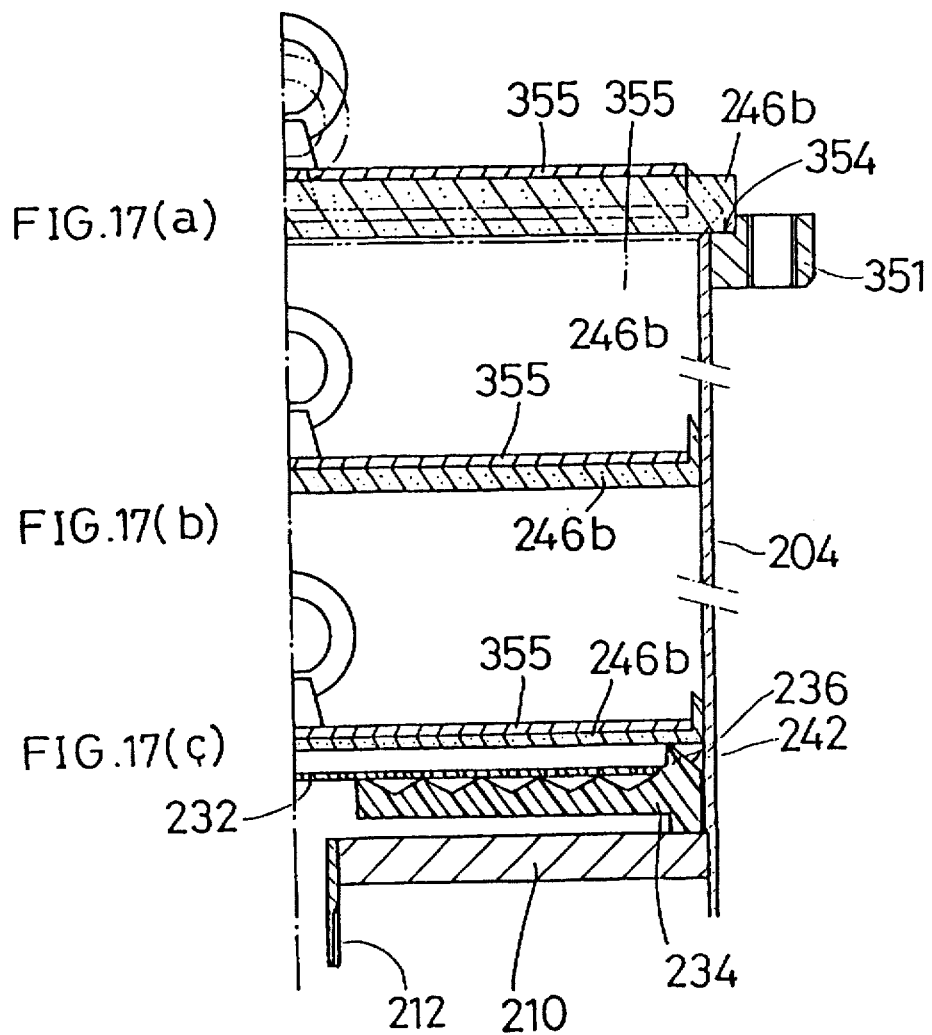
FIG.17(a)
FIG.17(b)
FIG.17(c)

WASHING APPARATUS AND OILY WATER SEPARATION DEVICE AND FILTRATION DEVICE BEST SUITED TO WASHING APPARATUS

TECHNICAL FIELD

The present invention relates to a washing apparatus and an oily water separation device and a filtration device best suited to the washing apparatus, and particularly to a washing apparatus suitable to wash a work obtained by a machining process such as a cutting process, a grinding process and a press working, and to an oily water separation device and a filtration device best suited to such a washing apparatus.

BACKGROUND OF THE INVENTION

Since cutting chips and machining oils are deposited on a machined work, a process for removing the cutting chips and the machining oils through washing is inevitably performed after the work has been machined.

Conventionally, in such a washing process, fleon, ethane, etc. are used as washing liquids.

Such washing liquids such as fleon and ethane are excellent in their cleaning efficiency but may cause environmental pollution, and therefore, their use will inevitably be inhibited in the near future.

For this reason, various kinds of washing liquids have been proposed for use in place of fleon and ethane and have been practically used. However, waste liquids of most of the proposed washing liquids may not be thrown out as they are after the washing process, and a special dealer must be retained for disposing the waste liquids as industrial wastes. Therefore, there has been a problem that considerable expenses must be born and that public nuisance may be caused in some cases.

For this reason, there has been desired for a washing apparatus which can be adapted for washing a work without using fleon or ethane and without using other types of washing liquids which involve the problem in their disposal. In connection with such a washing apparatus, there has been desired for an oily water separation device operable to efficiently separate oily water after the washing process, and there has been desired for an activated carbon filtration device operable to provide clean filtrate.

It is, accordingly, an object of the present invention to provide a washing apparatus which is operable to efficiently perform a washing process by using water, and which permits the washing liquid to be used in a recycle manner without being discharged to the outside as waste liquid, and which brings reduction of the washing costs, and which can inhibit environmental pollution and public nuisance attendant thereon.

It is another object of the present invention to provide a washing apparatus which may improve the washing efficiency by substantially entirely removing the sludges or oils deposited on materials to be washed and to reliably separate the removed sludges and oils from each other through both an impinging action of high-pressurized washing liquid and an impinging action of fine bubbles on the materials.

It is a further object of the present invention to provide a washing apparatus which may minimize residual sludges and oils in a bubbling section after removal and separation by bubbles in the bubbling section.

It is a still further object of the present invention to provide a washing apparatus in which removal of sludges and separation of oily water is performed in a two-stage manner so as to reliably and smoothly perform removal of the sludges and separation of the oily water and in which the life of the washing apparatus is improved.

It is a still further object of the present invention to provide a washing apparatus in which a washing process is efficiently performed in two vessels including a first bubbling vessel and a second bubbling vessel.

It is a still further object of the present invention to provide an oily water separation device which is best suited to a washing apparatus.

It is a still further object of the present invention to provide an oily water separation device in which the separation of oily water can be efficiently performed.

It is a still further object of the present invention to provide an oily water separation device in which the separation of oily water can be performed with excellent accuracy.

It is a still further object of the present invention to provide an oily water separation device in which the separation capability of a coalescer is excellently maintained so as to permit efficient separation of oily water.

It is a still further object of the present invention to provide an oily water separation device which is simple in construction.

It is a still further object of the present invention to provide an oily water separation device in which washing water can be effectively utilized without disposal.

It is a still further object of the present invention to provide an activated carbon filtration device which is optimal for use with a washing apparatus.

It is a still further object of the present invention to provide an activated carbon filtration device which may obtain clean filtrate liquid including no fine particles of activated carbon mixed therein when starting a filtration process.

It is a still further object of the present invention to provide an activated carbon filtration device which may reliably prevent fine particles of activated carbon from flowing out from the device by means of a filter.

It is a still further object of the present invention to provide an activated carbon filtration device which improves the degree of freedom in selection and design of a supporting member for a filter and which is economic to manufacture and efficient in use.

It is a still further object of the present invention to provide an activated carbon filtration device in which a filter can be easily and reliably mounted and in which fine particles of activated carbon are reliably prevented from flowing out from the device.

DISCLOSURE OF THE INVENTION

According to the present invention, there is provided a washing apparatus comprising a bubbling wash section for impinging bubbles in washing liquid to a material such as a machined work to be washed so as to remove solids such as sludges and oils adhered to the material to be washed, and a sludge removal and oily water separation section for removing sludges or the like mixed with the washing liquid at the bubbling wash section and for separating oily water in the washing liquid, the washing liquid passed through the sludge removal and oily water separation section being returned to the initial bubbling wash section for circulation. Thus, with the present invention, since the solids such as sludges and oils adhered to the machined work are removed by impinging the bubbles in the washing liquid, the removal can be efficiently performed by using water as the washing liquid. Additionally, since the washing liquid passed through the sludge removal and oily water separation section is returned to the initial bubbling wash section for circulation, the washing liquid is not discharged to the outside as waste water but is recycled.

Additionally, with this washing apparatus, it is preferable that the bubbling wash section includes a washing vessel for accommodating the material to be washed, and an aeration device for injecting the washing liquid mixed with bubbles into the washing vessel through a bubble injecting nozzle, the aeration device including a pump for pumping the washing liquid into the bubble injection nozzle, and an air suction valve connected to the pump on its suction side, whereby the air supplied from the air suction valve is converted into fine bubbles through a high-pressure mixing operation at the pump and is injected together with the washing liquid at high pressure from the bubble injection nozzle. With this construction, since the air supplied from the air suction valve is converted into the fine bubbles through the high-pressure mixing operation at the pump and is injected together with the washing liquid at high pressure from the bubble injection nozzle, the sludges and oils adhered to the material to be washed receives both the impinging action of the high-pressure washing liquid and the impinging action of the fine bubbles, so that the sludges and oils are substantially completely removed from the material to be washed, and in addition, the removed sludges and oils reliably rise upwardly as the micro bubbles rise.

Further, preferably, the bubbling wash section includes as the washing vessel a bubbling vessel for receiving the material to be washed and for performing the bubbling wash operation, and a receptor vessel for receiving the upper layer part of the washing liquid in the bubbling vessel. A liquid-surface absorbing device is disposed within the receptor vessel for introducing the washing liquid received by the receptor vessel in sequence, beginning with the upper layer part of the washing liquid, into the sludge removal and oily water separation section. With this construction, the upper layer part in the bubbling vessel including the sludges and oils risen together with the rising bubbles is delivered to the receptor vessel. Also in the receptor vessel, the washing liquid is delivered in sequence, beginning with the upper layer part, into the sludge removal and oily water separation section via the liquid-surface absorbing device. Therefore, the washing liquid is delivered in sequence, beginning with the part thereof including sludges and oils in rich, to the sludge removal and oily water separation section.

Furthermore, the sludge removal and oily water separation section preferably includes a first sludge removal and oily water separation section which utilizes the filtration operation without pressurizing the washing liquid for removing the sludges, etc. and which utilizes the spontaneous separation of the oily water by buoyancy, and a second sludge removal and oily water separation section which performs the removal of the sludges, etc. and which performs the separation of the oily water by forced filtration with the pressurized washing liquid. With this construction, the removal of the sludges and the separation of the oily water is roughly performed without pressuring the washing liquid in the first sludge removal and oily water separation section, and then the removal of the sludges and the separation of the oily water is precisely performed with the pressurized washing liquid in the second sludge removal and oily water separation section. With this two-stage construction, the filter in the second sludge removal and oily water separation section may be prevented from an excessive load which may be caused by clogging, etc.

In addition, preferably, the bubbling vessel of the bubbling wash section includes a first bubbling vessel and a second bubbling vessel which receives the over-flow washing liquid from the first bubbling vessel, and the receptor vessel is adapted to receive the over-flow washing liquid from the second bubbling vessel. With the bubbling vessel thus including the first bubbling vessel and the second bubbling vessel, the washing operation can be performed in a two-stage manner such that, for example, the first bubbling vessel receiving clear returning water is utilized for a finishing washing operation, while the second bubbling vessel arranged on the downstream side of the first bubbling vessel is utilized for a rough washing operation.

Further, according to the present invention, there is provided an oily water separation device comprising a body having an inlet of oily water to be separated, and an oil outlet and a water outlet disposed on an upper side and a lower side of the body for discharging oil components and water components after separation, respectively, and a hollow coalescer having therein an oily water passage connected to the inlet of the oily water to be separated, and a separated oil and water passage disposed between the coalescer and a wall part of the body and in communication with the oil outlet and the water outlet, so that the oily water which enters at the inlet of the oily water into the oily water passage of the coalescer is separated into oil components and water components through a wall of the coalescer, and wherein a partition wall is provided in the separated oil and water passage for producing a rising flow of the oil and water components separated by the coalescer. With this construction, since the rising flow is imparted to the oil and water components separated by the coalescer, the separated fine oil particles positively rise without depending on their buoyancy.

Preferably, the partition wall has a substantially cylindrical configuration surrounding the coalescer and has an upper end determined at substantially the same height as an upper end of the coalescer. With this construction, the separated oil/water may be risen to the height of the upper end of the coalescer.

Further, according to the present invention, there is provided an oily water separation device comprising a body having an inlet of oily water to be separated, and an oil outlet and a water outlet disposed on an upper side and a lower side of the body for discharging oil components and water components after separation, respectively; a hollow coalescer having therein an oily water passage connected to the inlet of the oily water to be separated; and a separated oil and water passage disposed between the coalescer and a wall part of the body and in communication with the oil outlet and the water outlet, so that the oily water which enters at the inlet into the oily water passage of the coalescer is separated into oil components and water components through a wall of the coalescer, wherein a back-washing device is provided for introducing washing liquid into the separated oil and water passage, and passing the washing liquid thorough the coalescer in a direction opposite to the direction for separation of the oily water, and thereafter discharging the washing liquid to the outside of the body via the oily water passage. With this construction, emulsion-like oils, etc. which may cause clogging of the coalescer can be removed from the coalescer by the back-washing process.

The back-washing device may preferably include a back-washing water supply pipe connected to the water outlet of the body, and a back-washing water discharge pipe connected to the inlet of the oily water, so that the back-washing can be performed by utilizing the water outlet and the inlet of the oily water which are originally provided on the body.

Further, preferably, the back-washing water supply pipe is connected to an outlet side of a separate oily water separation tank via a pump, and the back-washing water discharging pipe is connected to the inlet side of the oily water separation tank, so that the back-washing process can be performed with the back-washing water circulated while the back-washing water is purified by the separate oily water separation tank.

According to the present invention, there is provided a filtration device having activated carbon as filtration material disposed within a filtration tubular body, comprising a filter disposed on a filtrate flow-out side within the tubular body and permitting the filtrate to pass therethrough but preventing the filtration material from passing therethrough, a support member abutting on the filter on the filtrate flow-out side thereof and supporting the filter within the tubular body along an inner circumferential wall of the tubular body, and a filter groove formed by the outer periphery of the support member and the inner peripheral surface of the tubular body, the filter groove being covered by the outer periphery of the filter.

With the filter groove thus covered by the outer periphery of the filter, no gap is produced between the inner peripheral surface of the tubular body and the filter. Thus, the filter groove, more specifically, the outer periphery of the support member and the inner peripheral surface of the cylindrical body are covered by the outer periphery of the filter in such a manner that the filter extends like a vertical wall along the inner peripheral surface of the tubular body, so that the creation of gap between the inner peripheral surface of the tubular body and the filter can be prevented. Further, by virtue of the groove configuration, the filter can be reliably spread such that the filter is closely fitted on the inner peripheral surface of the tubular body. Further, the filter may not cause displacement when the activated carbon is charged, and the filter is reliably put in place through charging of the activated carbon into the groove portion. The configuration of the filter groove portion may be of substantially V-shaped configuration with the outer periphery of the support member being configurated as an inclined plate which is oriented toward the inner peripheral surface of the tubular body and which is inclined in a flow-out direction of the filtrate liquid so as to form substantially V-shaped groove between the inner peripheral wall of the cylindrical body and the outer periphery of the support member. Otherwise, the groove configuration may be of U-shaped configuration or of rectangular configuration. The groove configuration may be selectively determined, with due consideration of the facility of covering by the filter, etc.

This filtration device is intended to prevent the fine particles of activated carbon from flowing out of the device, and the device includes at least the activated carbon as the filtration material. However, the device may contain different kind of filtration materials.

Further, any kinds of filters may be used as far as they can prevent the filtration material from flowing out but do not prevent the filtrate from passing therethrough. Such filters may be those made of non-woven fabric, glass wool, absorbent cotton, woven or knitted fabric of natural or synthetic fibers, papers, etc.

In addition, preferably, the filtration device includes a protrusion provided on the outer periphery of the support member and oriented in a flow-in direction of the filtrate, so that the filter groove is formed by the outer periphery of the protrusion and the inner peripheral surface of the tubular body. With the provision of the protrusion, the state where the filter is engaged by the protrusion can be attained, so that the filter groove can be reliably covered by the filter. Further, if the protrusion is covered by a flexible filter, the filter may be prevented from displacement or breakage, so that the filter can be uniformly spread.

The filter groove or the outer periphery of the support member and the inner surface of the tubular body are required to be covered by the outer periphery of the filter. Thus, if the filter groove is not covered by the filter, fine particles located within the filter groove would possibly be moved to flow out together with the filtrate through a gap between the support member and the tubular body or through the support member.

In addition, not only the outer peripheral side of the holder member, the inner peripheral wall of the tubular body must be covered by the filter since, with the filter extending as a vertical wall along the inner peripheral surface of the body, the filter can be closely fitted on the inner peripheral wall of the tubular body by the activated carbon to be charged.

Further, if a filter having a size slightly smaller than the filter spread like a vertical wall is laid on the latter, the filter of the upper layer side may force the filter of the lower layer side to be reliably closely fitted on the inner peripheral wall of the tubular body. When the activated carbon is charged in this state, the filter of the lower layer side may be further reliably closely fitted on the inner peripheral surface of the tubular body.

Thus, by covering the entire filter groove by the filter, no gap is created between the inner peripheral surface of the tubular body and the filter while preventing the filter from displacement when the activated carbon is charged.

The support member is in abutment on the filtrate flow-out side of the filter as described above and serves to hold the filter in a predetermined position within the tubular body along the inner peripheral surface of the tubular body.

Therefore, if the filter itself is not rigid and is not durable to the pressure applied from the filtration material and the filtrate liquid, the support member must have a configuration analogous to the configuration of interior of the tubular body and must have a part permitting passage of the filtrate liquid.

If the filter itself is rigid, the support member may be disposed along the inner peripheral surface of the body such that the filter is held only at its outer peripheral portion.

In addition, the support member may serve to prevent passage of the fine particles at the outer side of the filter and to permit the passage of the filtrate only at the central side of the filter.

Further, preferably, the filter is made of non-woven fabric, the support member is in abutment on the non-woven fabric and has a smaller size than the configuration of the interior of the tubular body, and the support member includes a plate member for permitting the filtrate to flow therethrough and a plate support member for supporting the plate member at the central side of the tubular body. The plate support member has a protrusion formed on the outer periphery thereof and oriented toward the filtrate flow-into direction, so that the filter groove is formed by the outer periphery of the protrusion and the inner peripheral surface of the tubular body. Thus, by constituting the support member in combination of a plural number of members, the plate member can be reliably held, and it is possible to design with due consideration of the strength and the filtration efficiency.

Further, preferably, the filtration device includes a lid detachable from the tubular body, and an annular recess is formed on an inner peripheral portion of an upper end of the tubular body so as to receive a seal ring for sealing between the tubular body and the lid. The filter includes a filter member having an outer diameter greater than the inner diameter of the filtration tubular body. The outer diameter of the annular recess is determined substantially equal to the diameter of the filter member, so that a peripheral portion of the filter member can be brought into engagement with the annular recess when the seal ring is removed.

The present invention will become more fully apparent from the claims and the description as it proceeds in connection with the drawings.

BRIEF DESCRIPTION OF THE DRAWINGS

FIG. 16 is a view of the construction of an upper portion of a filtration device of another embodiment;

FIGS. 17(a), FIG. 17(b) and FIG. 17(c) are views showing steps in sequence of positioning a lower non-woven fabric on the bottom of a tubular body of the filtration device shown in FIG. 16.

BEST MODES OF EMBODYING THE INVENTION

Figure 1:
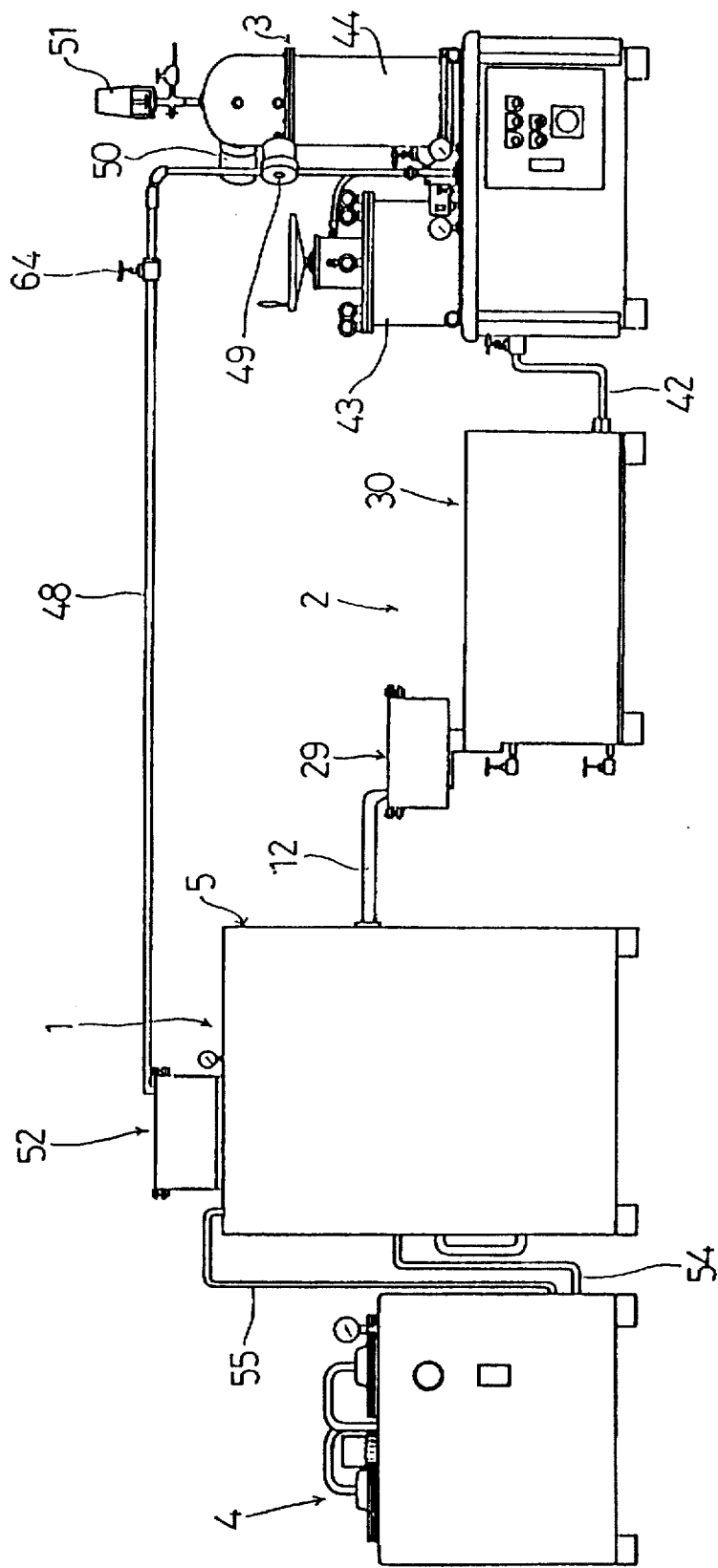
FIG. 1 is a schematic view of the overall washing apparatus according to a first embodiment of the present invention.

A washing apparatus according to a first embodiment of the present invention will now be explained with reference to FIGS. 1 to 5. The overall construction of the washing apparatus is shown in FIG. 1, and the washing apparatus comprises a bubbling wash section 1 for receiving a machined work and for performing a washing process through bubbling as will be explained later; a first sludge removal and oily water separation section 2 for removing solids such as sludges contained in washing liquid (water or hot water) utilized in the bubbling wash section 1 and for subsequently separating the oily water; a second sludge removal and oily water separation section 3 for further removing smaller sludges and for further precisely separating the oily water; and an activated carbon filtration section 4 for clarifying the washing liquid used in the bubbling wash section 1 by means of activated carbon. Here, the washing liquid passed through the second sludge removal and oily water separation section 3 is returned to the initial bubbling wash section 1, so that a circulation path of bubbling wash section 1—first sludge removal and oily water separating section 2—second sludge removal and oily water separating section 3—bubbling wash section 1 is formed.

Figure 2:
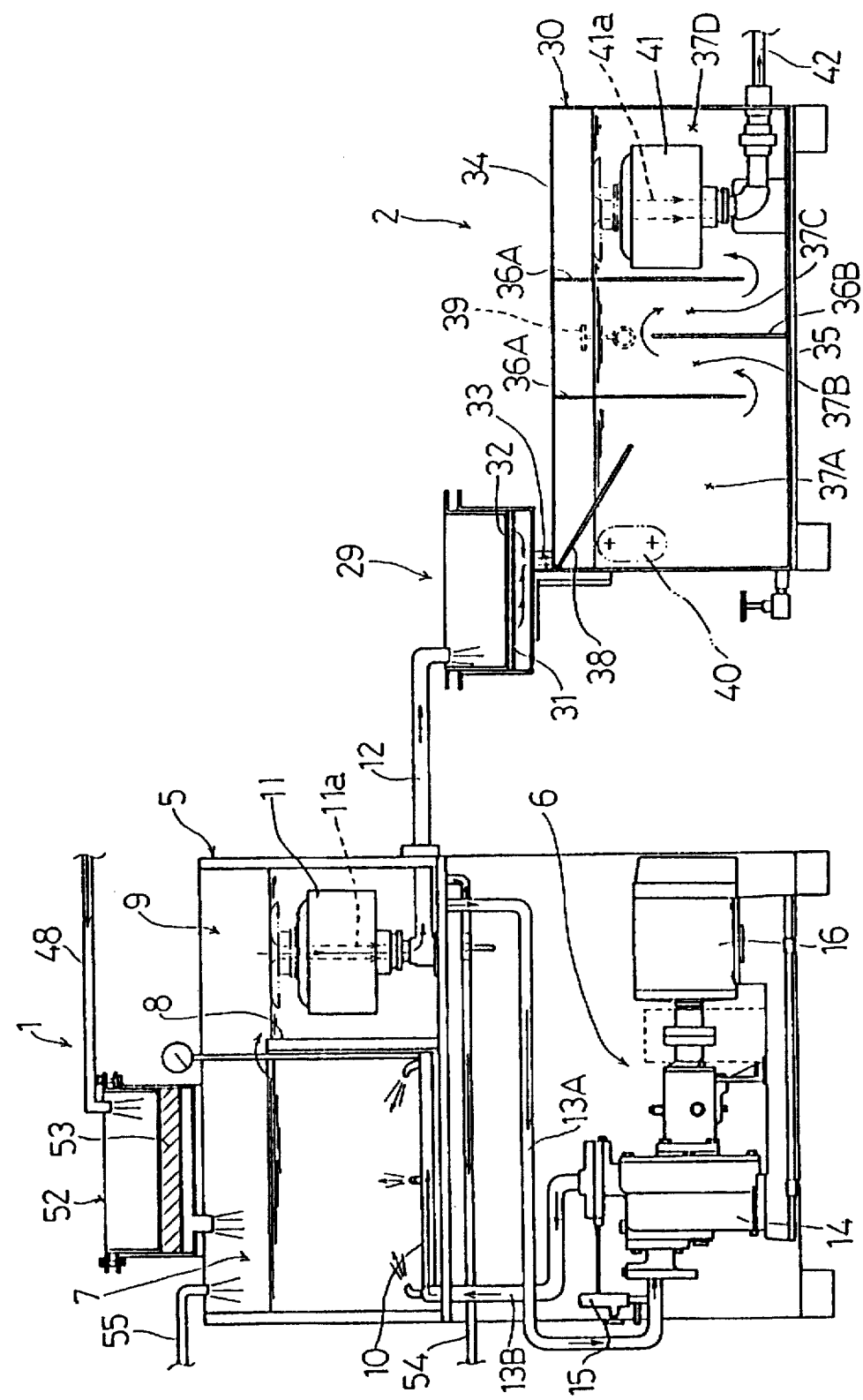
FIG. 2 is a vertical sectional view of a bubbling wash section and a first sludge removal and oily water separation section of the washing apparatus shown in FIG. 1.

The bubbling wash section 1 and the first sludge removal and oily water separation section 2 are shown in detail in FIG. 2. Firstly, an explanation will be made in connection with the bubbling wash section 1. The bubbling wash section 1 is constituted mainly of a washing vessel 5 for receiving the work, and an aeration device 6 disposed below the washing vessel 5. The washing vessel 5 includes a bubbling vessel 7 for receiving the work to be washed and an over-flow liquid receiving vessel 9 separated from the bubbling vessel 7 by means of a partition wall 8.

A bubble injection nozzle 10 is disposed at the bottom of the bubbling vessel 7 and is connected to the aeration device 6. The aeration device 6 forms a mixed flow of the washing liquid and fine bubbles as will be explained later and the mixed flow is injected from the bubble injection nozzle 10 so as to be impinged on the work, so that the sludges, oils, etc. adhered to the work surface rise together with the bubbles, to reach the upper layer part in the bubbling vessel 7. Here, by means of the above described circulation path, the washing liquid returned from the second sludge removal and oily water separation section 3 is continuously supplied to the bubbling vessel 7, so that the sludges, oils, etc. risen together with the bubbles to the upper layer part of the bubbling vessel 7 are flown over the partition wall 8 into the over-flow liquid receiving vessel 9 together with the washing liquid.

A liquid-surface absorbing device 11 is disposed within the over-flow liquid receiving vessel 9 and includes a vertical flow channel 11a formed therein and having an open upper end. A pipeline 12 is connected to the lower portion of the liquid-surface absorbing device 11 and extends through a wall of the over-flow liquid receiving vessel 9 into the first sludge removal and oily water separation section 2, so that the washing liquid flowing downwardly in the channel 11a is supplied to the first sludge removal and oily water separation section 2 via the pipeline 12. Here, the liquid-surface absorbing device 11 is constructed such that the position of the upper end of the channel 11a is variable in a vertical direction and is known as a brand name "UP-DOWN SKIMMER".

The aeration device 6 will now be explained. The aeration device 6 includes a volute pump 14 which has a suction side connected to the bottom of the over-flow liquid receiving vessel 9 via a pipeline 13A and which has a discharge side connected to the bubble injection nozzle 10 via a pipeline 13B, and an automatic air suction valve 15 located on a part of the pipeline 13A adjacent the volute pump 14 or at a position adjacent the volute pump 14 on the upstream side thereof. The volute pump 14 as well as its drive motor 16 is fixed to the lower portion of the bubbling wash section 1 and serves to pump the relatively clean washing liquid existing on the bottom side of the over-flow liquid receiving vessel 9 and to atomize the air supplied from the automatic air suction valve 15 so as to deliver the atomized air to the bubble injection nozzle 10 together with the washing liquid.

Figure 3:
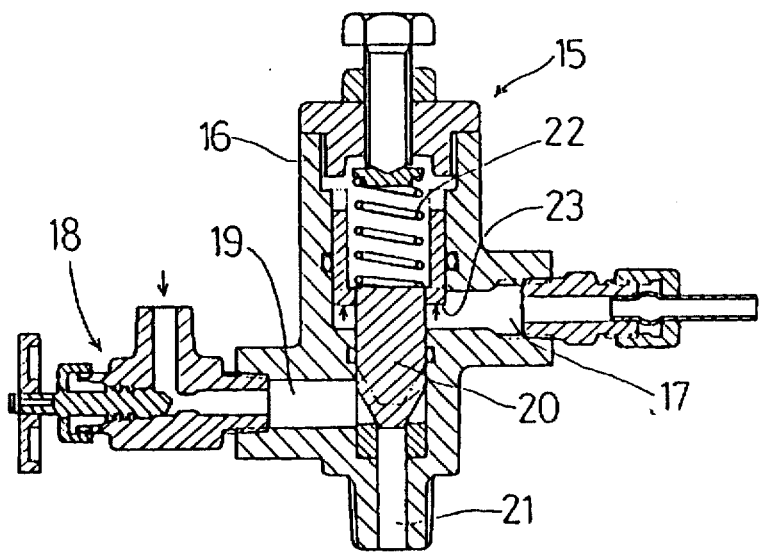
FIG. 3 is a sectional view of an automatic air suction valve shown in FIG. 2.

The automatic air suction valve 15 is constructed such that the mixing ratio of the air is automatically stably maintained irrespective of the discharge amount from the volute pump 14, and the valve 15 incorporates the same construction as disclosed in Japanese Utility Model Publication No. 57-47439 in the name of the same applicant as the present application. More specifically, as shown in FIG. 3, the automatic air suction valve 15 includes a liquid-pressure introducing inlet 17 which is connected to the discharge side of the volute pump 14 for introducing a part of the discharged washing liquid into a valve body 16; an air inlet 19 for introducing the air from the outside via an adjustable valve mechanism 18; and an air outlet 21 in communication with the air inlet 19 via a piston valve 20. The air outlet 21 is connected to the pipeline 13A of the suction side. The piston valve 20 is normally biased by a spring 22 in a direction to interrupt communication between the air inlet 19 and the air outlet 21, and a pressure receiving surface 23 is formed on the piston valve 20 for receiving the liquid pressure which is introduced from the liquid-pressure introducing inlet 17. With this construction, the piston valve 20 is lifted against the spring 22 in response to the liquid pressure applied to the pressure receiving surface 23, so that the communication area between the air inlet 19 and the air outlet 21 is increased and that the amount of air to be introduced into the pipeline 13A is increased.

Figure 4:
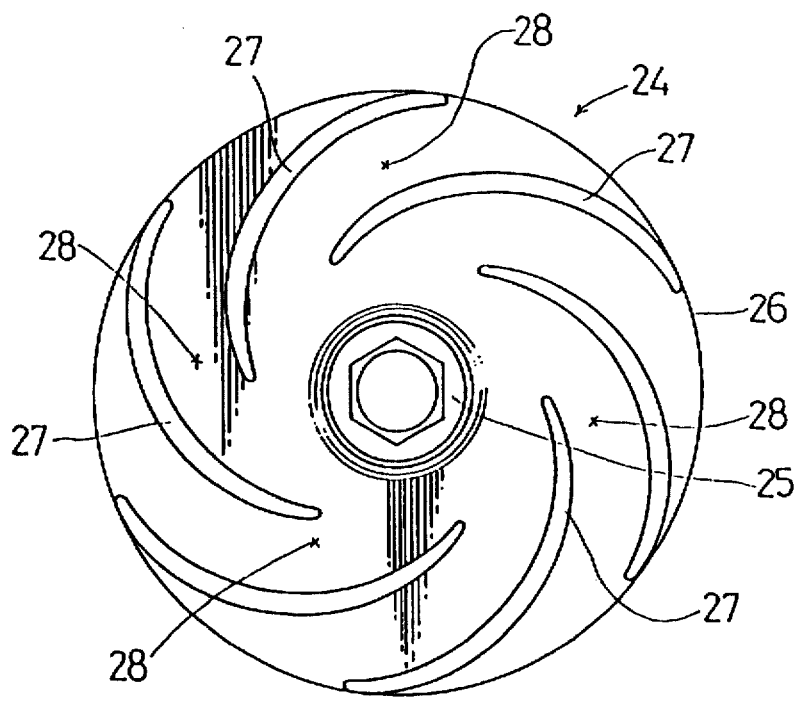
FIG. 4 is a side view of an impeller incorporated into a volute pump shown in FIG. 2.

The air introduced into the pipeline 13A from the automatic air suction valve 15 is introduced into the volute pump 14 together with the washing liquid within the pipeline 13A, and the air is atomized by the volute pump 14 and is delivered to the bubble injection nozzle 10 together with the washing liquid as described above. In this volute pump 14, an impeller 24 shown in FIG. 4 is incorporated. The impeller 24 has the same construction as the impeller disclosed in Japanese Patent Application No. 1-269588 (Japanese Laid-Open Patent Publication No. 3-130598) in the name of the same applicant as the present application. More specifically, the impeller 24 has a basic construction in which a plurality of vanes 27 are formed on one side of a main plate 26 having a centrally positioned boss 25. The vanes 27 extend in an axial direction of the boss 25 and are equally spaced from each other in a circumferential direction. Fluid channels 28 are formed between each of the vanes 27, and each fluid channel 28 has a width gradually decreasing in a direction toward the outer periphery of the main plate 26, beginning from the position around the boss 25. Each of the vanes 27 has a uniform thickness in the circumferential direction except a part adjacent the boss 25. The thickness of the part of each vane 27 adjacent the boss 25 decreases in a direction toward the boss 25. Thus, since each of the fluid channels formed between each of the vanes 27 has the width gradually decreasing toward the outer periphery of the main plate 26, the impeller 24 may have an improved weight balance, and the head and the efficiency of the volute pump 24 are improved. These advantages are further enhanced by the special determination of the thickness of each vane 27 as described above since the washing liquid may smoothly flow into the area between each of the vanes 27.

As described above, with this embodiment, by virtue of combination of the automatic air suction valve 15 which is operable to automatically stably maintain the air mixing ratio and the volute pump 14 which is excellent in the head and the efficiency, the air is mixed within the volute chamber at high pressure (3–5 Kg/cm$^2$) so as to be atomized (a few micron, about 0.2 or 0.3 mm) and is injected from the bubble injection nozzle 10 at high pressure while the atomized condition is stably maintained.

The air thus atomized and injected at high pressure provides a substantial effect for removing the sludges and oils when impinged on the work, and can effectively convey the removed sludges and oils when they are raised by their buoyancy. The upper layer part of the washing liquid including the sludges and oils raised by the bubbles flow into the over-flow liquid receiving vessel 9 over the partition wall 8, and the upper layer part in the over-flow liquid receiving vessel 9 including the sludges and oils in quantity is also introduced from the liquid-surface absorbing device 11 to the first sludge removal and oily water separation section 2 via the pipeline 12.

The construction of the first sludge removal and oily water separating section 2 will now be explained with reference to FIG. 2. The first sludge removal and oily water separation section 2 includes a sludge removing device 29 for removing solids such as sludges from the washing water supplied from the bubbling wash section 1 via the pipeline 12, and the first sludge removal and oily water separation section 2 also includes an oily water separation tank 30 for separating the oily water in the washing liquid which has been passed through the sludge removing device 29. The sludge removing device 29 is mounted on an upper portin of the oily water separation tank 30 and has a container-like configuration for receiving the washing liquid which spontaneously flows down from the pipeline 12. The sludge removing device 29 has a construction in which a filter 32 made of layered non-woven fabric mats is put on an intermediate bottom-like perforated plate 31. The filter 32 is formed by two or three pieces of mats which are laid one after another in such a manner that the mat having finer mesh is positioned in sequence below one having a coarser mesh, so that the sludges having a diameter larger than about 10 microns can be removed. The washing liquid from which the sludges have been removed, spontaneously flows down into the oily water separation tank 30 via a discharge pipe 33 connected to the bottom of the sludge removing device 29.

The oily water separation tank 30 is divided into four sections or first to fourth vessels 37A to 37D by two downwardly oriented partitition plates 36A and an upwardly oriented partition plate 36B positioned between the partition plates 36A. The partition plates 36A are mounted on a lid plate 34 and extend downwardly therefrom. The partition plates 36A have lower ends spaced from a bottom plate 35 by suitable gaps. The partition plate 36B extends upwardly from the bottom plate 35 and forms a suitable gap between the partition plate 36B and the lid plate 34. A slant plate 38 is mounted on an upper portion of the first vessel 37A for receiving the washing liquid flowing douwnwardly from the discharge pipe 33. Therefore, the washing liquid is spontaneously separeted when it flows downwardly along the slant plate 38, and the oils and water in the washing liquid are separately positioned on the upper layer side and the lower layer side in the first vessel 37A, respectively. The washing liquid positioned on the lower layer side underflows into the second vessel 37B through the gap between the downwardly oriented partition plate 36A positioned on the front side and the bottom plate 35, and the washing liquid then flows into the third vessel 37C over the upwardly oriented partition plate 36B. The washing liquid flown into the third vessel 37C subsequently underflows into the fourth vessel 37D through the gap between the downwardly oriented partition plate 36A positioned on the rear side and the bottom plate 35. By virtue of such repeated underflow and overflow, the separation of the oily water is accellerated.

Further, an oil extraction cock 39 for discharging the separated oil to the outside is disposed on a lateral side of the oily water separation tank 30 in a position at a suitable height above the upwardly oriented partition plate 36B (communication area between the second vesssel 37B and the third vesssel 37C). In addition, an oil pot window 40 is disposed on a front side of the oily water separation tank 30. With this construction, an operator can operate the oil extraction cock 39 to discharge the risen and accumulated oil while visually recognizing the accumulation state of the oil through the oil pot window 40. Other than the manual operation, the extration of the oil can be automatically performed, for example, by actuating an open-close solenoid valve by means of an oil boundary surface sensor.

A liquid-surface abrsorbing device 41 similar to the liquid-surface absorbing device 11 described in connection with the bubbling wash section 1 is disposed within the fourth vessel 37D, and a vertical channel 11a of the liquid-surface absorbing device 41 has an open upper end and is connected to a pipeline 42 which extends through a wall of the oily water separation tank 30 into the second sludge removal and oily water separation section 3. Therefore, relatively clear washing liquid flown into the liquid-surface absorbing device 41 from the upper layer part in the fourth vessel 37D is introduced into the second sludge removal and oily water separation section 3.

The second sludge removal and oily water separation section 3 serves to remove more fine sludges and to further precisely separate the oily water while the washing liquid is forcibly passed through this section 3. As shown in FIG. 1, the second sludge removal and oily water separation section 3 is constituted mainly of a filtration tube and an oily water separation tube. A piping system of this second sludge removal and oily water separation section 3 is shown in FIG. 3. The pipeline 42 of the liquid-surface absorbing device 41 is connected to the filtration tube 43 via a pump P, and the filtration tube 43 is connected to the oily water separation tube 44 via a pipeline 45. A pressure-adjusting valve 46 is provided in the midway of the pipeline 45. When the pressure of the washing liquid supplied to the oily water separation tube 44 exceeds a predetermined pressure, the pressure-adjusting valve 46 is operated to return a part of the washing liquid to the upstream side of the pump P or to the pipeline 42 via a bypass pipeline 47.

Here, a filter of fine mesh (not shown) is disposed within the filtration tube 43, and the washing liquid is forced and passed through the filter by the pump P, so that fine sludges (in the order of 3–1 micron) are removed. The washing liquid is then delivered to the oily water separation tube 44 via the pipeline 45. A fibrous tubular member called "coalescer" made of glass fiber, etc. is disposed within the oily water separating tube 43. The washing liquid is forcibly passed from inside of the tubular member to the outside thereof in a radial direction, so that the oil components and the water components are separated to be accumulated in the upper layer and the lower layer at the outside of the tubular member, respectively. The water components or the washing liquid from which the oil components have been removed is taken out from the lower layer and is returned to the bubbling vessel 7 of the bubbling section 1 via a pipeline 48. On the other hand, the oil components are automatically discharged through actuation of a solenoid valve 51 based on the detection of boundary surface by means of an oil boundary surface sensor 49 and a water boundary surface sensor 50 (see FIG. 1). The oil boundary surface sensor 49 and the water boundary surface sensor 50 are utilized for an open operation and a close operation, respectively, of the solenoid valve 51.

Figure 7:
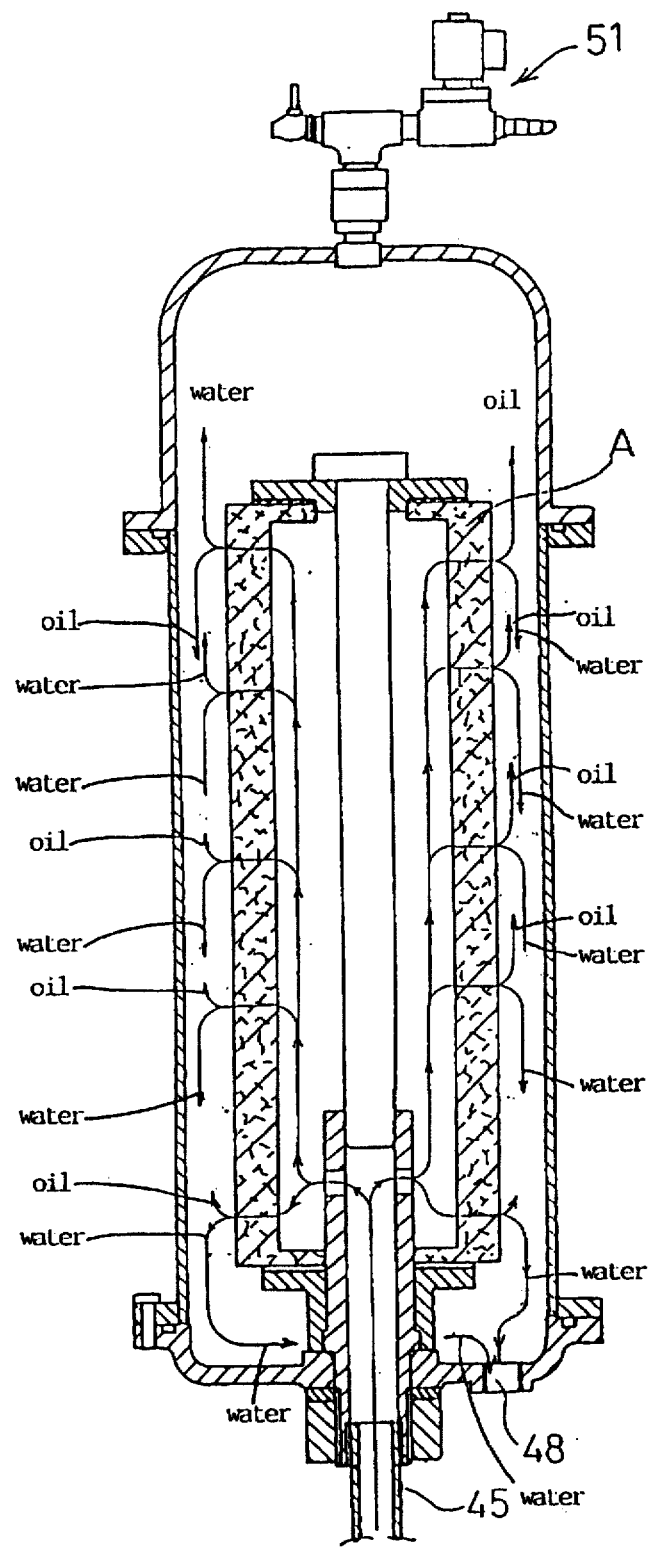
FIG. 7 is a vertical sectional view of an oily water separation device for use in the washing apparatus.

A typical construction of an oily water separation device utilized as the oily water separation tube 44 is shown in FIG. 7. The oily water separation tube shown in FIG. 7 includes therein a tubular coalescer A made of glass wool or other fibrous materials as an oily water separation layer. The washing liquid (emulsified oily water) is introduced Into the interior of the coalescer A via the connecting pipeline 45 under pressure (0.2–1.0 Kg/cm$^2$). The washing liquid is physically separated into oil components and water components while passing through the coalescer A from inside thereof to the outside, and the separated oil components are accumulated at the upper portion of the separation device and are discharged to the outside through the solenoid valve 51. On the other hand, the water components are discharged from the lower portion of the separation device to the pipeline 48.

Although the washing liquid (10–20 PPM in oil content) is returned to the bubbling vessel 7 of the bubbling section 1 via the pipeline 49 after the fine sludges have been removed and the oil components have been precisely removed as described above, in some cases, oil particles such as those having a diameter of about 0.05–0.03 mm flow out when the inner pressure of the coalescer is increased to about 1.5–2 Kg/cm$^2$ for example. It appears that this phenomenon has been caused for the reason that, when the clogging has been caused to increase the inner pressure of the coalescer, the oil components absorbed onto the inner wall of the fibrous tubular body constituting the coalescer is pushed outwardly since the inner wall is pushed by the inner pressure. The particles of the oil components which have been pushed outwardly are formed into a spherical configuration, and for example, when the washing liquid is taken out into a beaker and is put in a still standing state, the particles of the oil rise to the surface to form a thin film on the surface after 3–5 minutes have elapsed.

For this reason, with this embodiment, an oil absorption device 52 (see FIG. 2) is disposed on an upper portion of the bubbling vessel 7, and the washing liquid flown out from the pipeline 48 by opening the solenoid valve 64 flows into the bubbling vessel 7 through the oil absorption device 52. The oil absorption device 52 includes an absorption mat 53 made of non-woven fabric of polypropylene family, and the oil concentrate of 10–20 PPM can be obtained by using this mat 53, so that the separation accuracy can be stably maintained.

With the action of the coalescer of the oily water separation tube 44 of the second sludge removal and oily water separation section 3, for example, when the operation of the second sludge removal and oily water separation section 3 is repeated after stopping the washing operation (after taking out the washed work), the oil concentration can be reduced to substantially 10 PPM by about 5 to 10 times of passing through the second sludge removal and oily water separation section 3 although it may depend on the oil concentration in the washing liquid when the washing operation has been stopped. Further, the incorporation of the oil absorption device 52 is advantageous in that the stability in the separation accuracy can be obtained even if the coalescer is not in a normal operating condition, and that the life of the coalescer may be extended and that the costs may be substantially reduced.

As described above, with the circulation path of first bubbling wash section 1—first sludge removal and oily water separation section 2—second sludge removal and oily water separation section 3—bubbling wash section 1, the removal of the sludges in the washing liquid and the separation of the oily water therein can be highly accurately performed. However, particularly when the hot water washing has been performed, the clarity of the washing liquid may be degraded due to water scales or fine residual materials such as surface active agents, pigments and iron components deposited on the work through evaporation of the water. For this reason, in this embodiment, the activated carbon filtration section 4 is provided for clarifying the washing liquid in the bubbling wash section 1 by means of activated carbon as described previously. As shown in FIGS. 1 and 2, the activated carbon filtration section 4 is connected to the bottom of the over-flow liquid receptor vessel 9 via a pipeline 54, and the washing liquid in the over-flow liquid receptor vessel 9 is pumped by a pump (not shown) to forcibly pass the washing liquid through an activated carbon layer (not shown), so that the water scales or the fine residual materials can be removed from the washing water, and that the washing water after filtration is returned to the bubbling vessel 7 via a pipeline 55. Here, the activated carbon filtration section 4 is not required to be always operated but may be operated occasionally according to the degree of clarification of the washing liquid.

As described above, with this embodiment, firstly in the bubbling wash section 1, the sludges and oils adhered to the work to be washed are effectively removed in the bubbling vessel 7 through impingement of the washing liquid mixed with air on the work to be washed. Next, in the first sludge removal and oily water separation section 2, the sludges are roughly removed while the oils are separated through natural separation and are removed. Subsequently in the second sludge removal and oily water separation section 3, the removal of sludges and separation of the oily water is precisely performed, and the washing water is then returned to the bubbling wash section 1. Thus, this embodiment is advantageous in the following points: Firstly, the effective washing can be performed by simply using water without using washing liquids such as fleon and ethane which involve the problem in their disposal, and therefore, this embodiment is greatly useful for inhibiting the public pollution. In addition, since expensive wishing liquids as in the prior art are not required, the washing costs may be reduced. Further, the water after use in the washing operation is not disposed but is again used in a circulation manner, so that the resources are nursed and that the washing costs are further reduced.

Particularly, in this embodiment, the aeration device 6 provides the washing liquid including stably atomized air, and such washing liquid is injected at high pressure from the bubble injection nozzle 10. Therefore, the sludges and oils adhered to the work are effectively removed through both actions of the washing liquids and the fine bubbles injected at high pressure, and they are risen as the bubbles rise to the surface, so that an excellent washing effect can be obtained.

Additionally, the upper layer part of the washing liquids including the sludges and oils thus risen flows over the partition wall 8 into the overflow liquid receiving vessel 9, and is introduced into the first sludge removal and oily water separation section 2 via the liquid-surface absorbing device 11, beginning also with the upper layer part of the washing liquids in the vessel 9 which include the sludges and oils in quantity, so that the residual sludges or oils in the bubbling section 7 and the overflow liquid receiving vessel 9 can be minimized.

Further, prior to the forced sludge removing and oily water separation process by the pressure in the second sludge removal and oily water separation section 3, the sludge removing and oily water separation process is performed in the first sludge removal and oily water separation section 2 by gravity or spontaneous separation without using pressure. Therefore, an excessive load which may be caused due to clogging of the filter adapted for removing the sludges or clogging of the coalescer adapted for separation of the oily water in the second sludge removal and oily water separation section 3 can be reduced. This may provide advantages that the removal and separation process in the second sludge removal and oily water separation section 3 can be smoothly performed and that the life of the devices can be extended.

In addition, as described above, since the washing liquid is returned from the second sludge removal and oily water separation section 3 to the bubbling wash section 1 via the oil absorption device 52, it is advantageous that an accidental flow of oils into the bubbling wash section 1 due to the abnormal functioning of the coalescer can be prevented, and that the safety in the separation accuracy can be obtained when the coalescer is in the normally functioning state. Further, the life of the coalescer can be extended to substantially reduce the costs.

The washing liquid can be maintained to be clean by occasionally operating the activated carbon filtration section 4 according to the clarification degree of the washing liquid.

Figure 6:
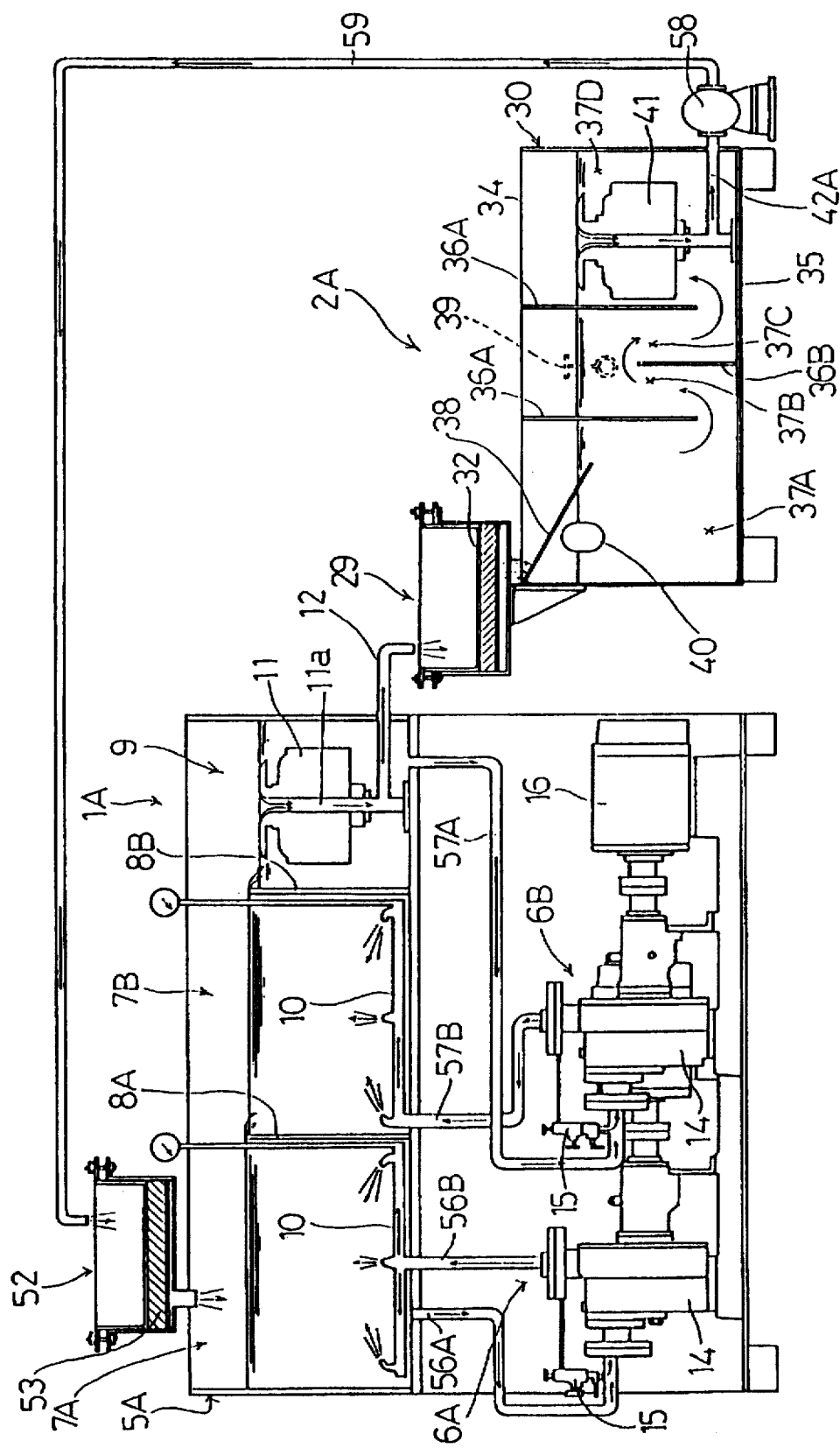
FIG. 6 is a vertical sectional view of a washing apparatus according to a second embodiment of the present invention.

A second embodiment of the present invention will now be explained with reference to FIG. 6. This embodiment is a modification to simplify the construction of the first embodiment. Like members are given the same reference numerals and their description will not be repeated.

This embodiment includes a bubbling wash section 1A, and a sludge removal and oily water separation section 2A which is the same as the first sludge removal and oily water separation section 2 of the first embodiment where the washing liquid is not pressurized. The sludge removal and oily water separation section through forced separation is omitted in this embodiment.

A washing vessel 5A of the bubbling wash section 1A includes two bubbling vessels, a first bubbling vessel 7A and a second bubbling vessel 7B, and a first aeration device 6A and a second aeration device 6B are disposed on the lower portions of their respective bubbling vessels. With this construction, the bubbling wash operation can be performed in each of the first bubbling vessel 7A and the second bubbling vessel 7B through the bubble injection nozzles 10 positioned at their bottoms. The first bubbling vessel 7A and the second bubbling vessel 7B are separated by a partition wall 8A, so that the washing liquid flows over the partition wall 8A from the first bubbling vessel 7A into the second bubbling vessel 7B. The overflow liquid receiving vessel 9 having the liquid-surface absorbing device 11 as provided in the first embodiment is positioned adjacent the second bubbling vessel 7B and is separated therefrom by means of a partition wall 8B, so that the washing liquid flows over the partition wall 8B from the second bubbling vessel 7B into the overflow liquid receiving vessel 9.

As with the aeration device 6 of the first embodiment, each of the first aeration device 6A and the second aeration device 6B includes the volute pump 14 and the automatic air suction device 15. The volute pump 14 of the first aeration device 6A has the suction side connected to the bottom of the first bubbling vessel 7A via a pipeline 56A and has the discharge side connected to the bubble injection nozzle 10 disposed within the first bubbling vessel 7A via a pipeline 56B. Thus, the first aeration device 6A performs the bubbling wash operation through a circulating flow within the first bubbling vessel 7A. On the other hand, the volute pump 14 of the second aeration device 6B has the suction side connected to the bottom of the overflow liquid receiving vessel 9 via a pipeline 57A and has the discharge side connected to the bubble injection nozzle 10 disposed within the second bubbling vessel 7B via a pipeline 57B. Thus, the second aeration device 6B serves to pump the relatively clean washing liquid existing on the bottom side of the overflow liquid receiving vessel 9 so as to apply that washing liquid for bubbling wash operation at the second bubbling vessel 7B.

The washing liquid flowing out of the liquid-surface absorbing device 11 of the overflow liquid receiving vessel 9 via the pipeline 12 is adapted for removal of the sludges by the sludge removing device 29 and for separation of the oily water by the oily water separation tank 30 in the sludge removal and oily water separation section 2A as in the first sludge removal and oily water separation section 2 of the first embodiment. The washing liquid is then flows to the outside from the liquid-surface absorbing device 41 via a pipeline 42A.

The pipeline 42A is connected to a returning pipeline 59 for returning the washing liquid to the bubbling wash section 1A via a pump 58, so that oils of the washing liquid flowing downwardly from the returning pipeline 59 is removed through absorption by the oil absorption device 52 disposed above the first bubbling vessel 7A of the bubbling wash section 1A in the same manner as the first embodiment. The washing liquid is thereafter delivered to the first bubbling vessel 7A As described above, the washing apparatus of the second embodiment is a simplified version of the apparatus of the first embodiment and does not include the sludge removal and oily water separation section with forcible separation. However, this apparatus is sufficient to cope with a work which is not so precisely required to remove sludges and to separate oily water, and this apparatus can be constructed at lower costs compared with the apparatus of the first embodiment.

Further, particularly in this embodiment, the washing vessel 5A of the bubbling wash section 1A includes two bubbling vessels, the first bubbling vessel 7A and the second bubbling vessel 7B. In the first bubbling vessel 7A, the bubbling wash operation is performed by using the clear washing liquid which is returned from the sludge removal and oily water separation section 2A via the oil absorption device 52. On the other hand, in the second bubbling vessel 7B, the bubbling wash operation is performed by using the relatively clear washing liquid existing at the lower portion of the overflow liquid receiving vessel 9. Therefore, the washing operation of the work can be effectively performed with the work replaced in sequence from the second bubbling vessel 7B to the first bubbling vessel 7A, such that the work to be washed Is firstly entered to the second bubbling vessel 7B for rough washing operation and that the work is then entered to the first bubbling vessel 7A for finish washing operation. Thus, this embodiment is advantageous in that the total time required for the washing operation is shortened compared with the case of the first embodiment which utilizes only one bubbling vessel 7.

Meanwhile, the coalescer A of the oily water separation tube 44 serves to separate the oily water through absorption of the oil on the fibrous material constituting the coalescer A. Another embodiment of an oily water separation device which utilizes the coalescer and which is improved to further efficiently separate the oily water will now be explained.

Figure 8:
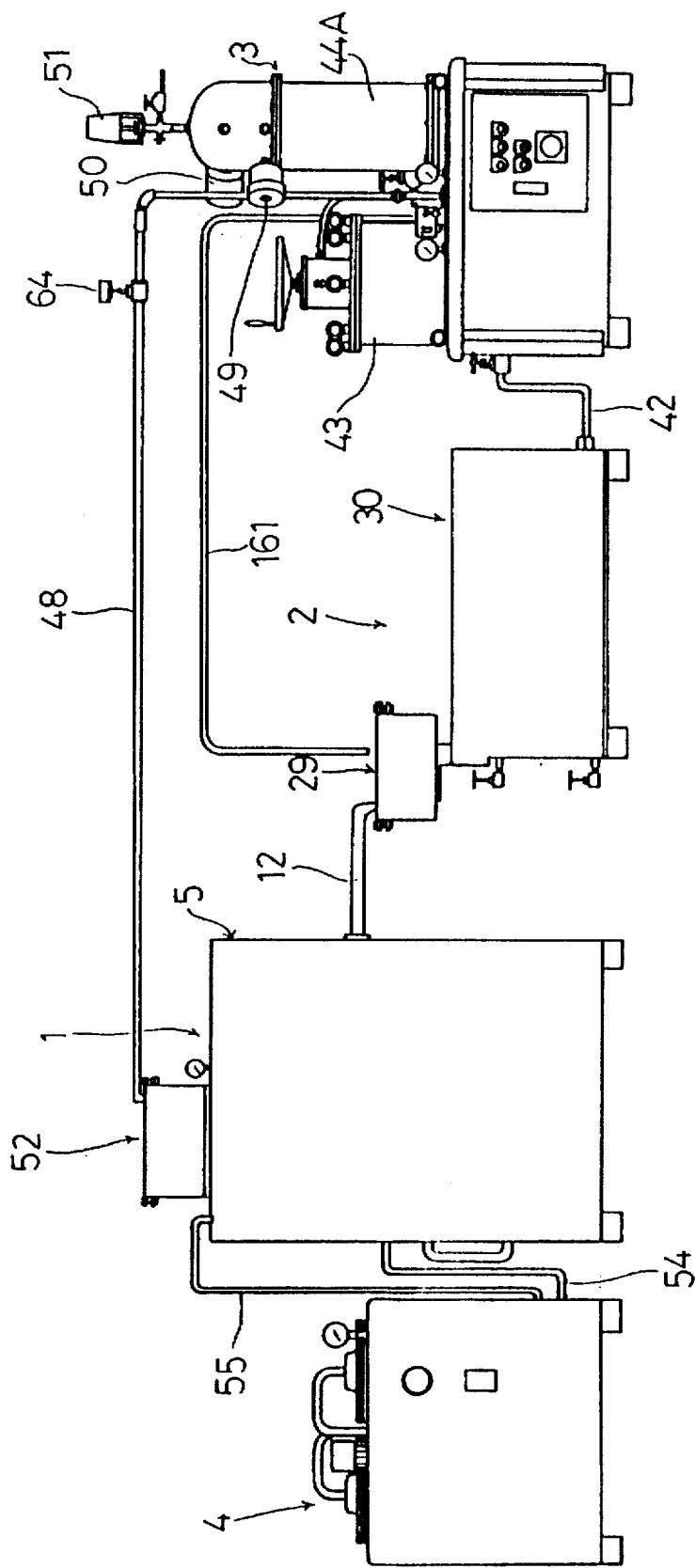
FIG. 8 is a schematic view of the overall washing apparatus incorporating an oily water separation device according to another embodiment of the present invention.
Figure 9:
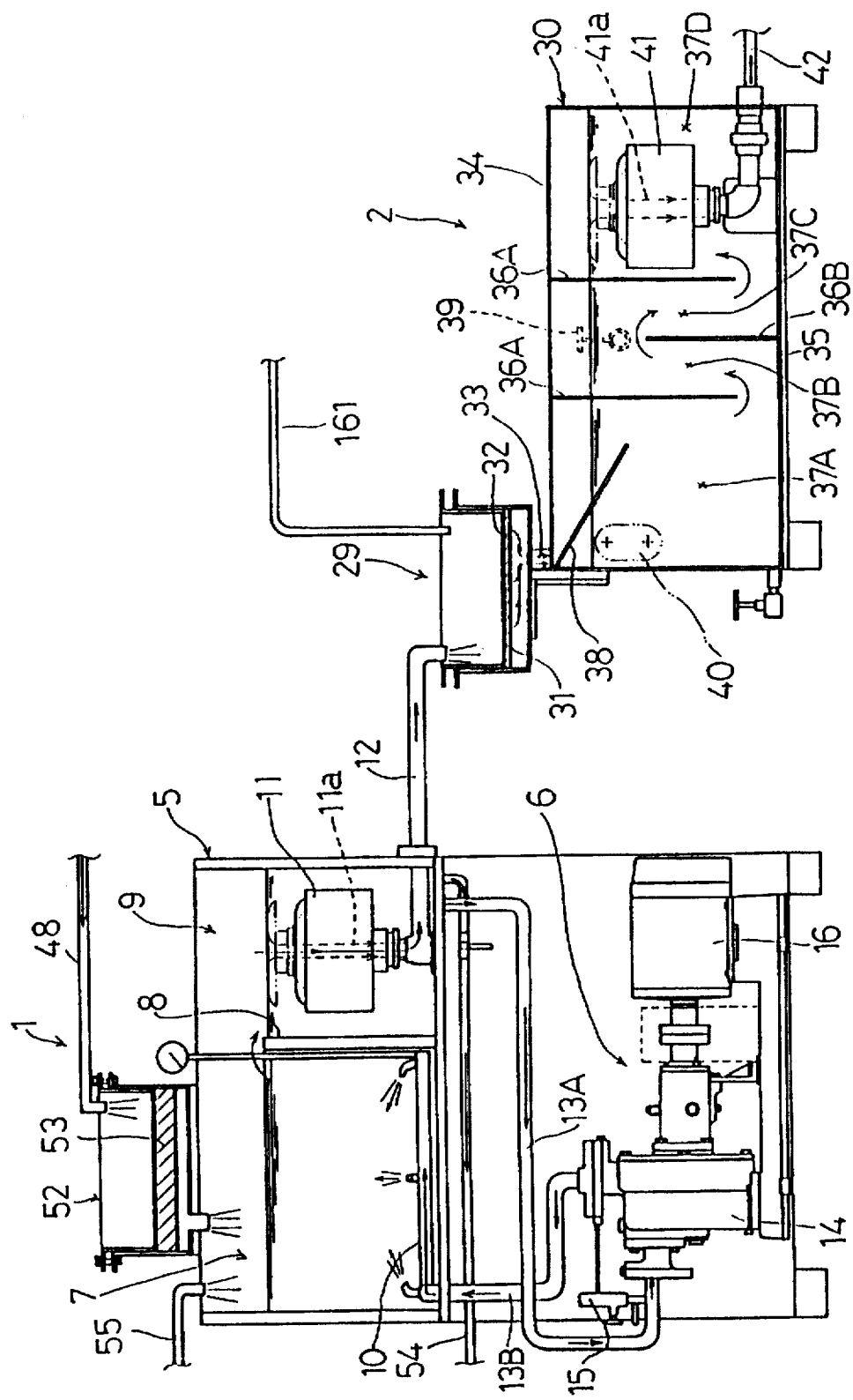
FIG. 9 is a vertical sectional view of a bubbling washing section and a first sludge removal and oily water separation section of the washing apparatus shown in FIG. 8.

An oily water separation device 44A of this embodiment is adapted to be incorporated as one of the components of a washing apparatus as the above described washing apparatus. The overall construction of the washing apparatus incorporating the oily water separation device 44A is shown in FIG. 8 which corresponds to FIG. 1. A bubbling wash section and a first sludge removal and oily water separation section is shown in FIG. 9 which corresponds to FIG. 2. In these drawings, members that are the same as those of the above embodiment are given like reference numerals. As will be apparent from FIGS. 8 and 9, the change in the whole washing apparatus is only the provision of a back-washing water discharge pipeline 161.

Figure 10:
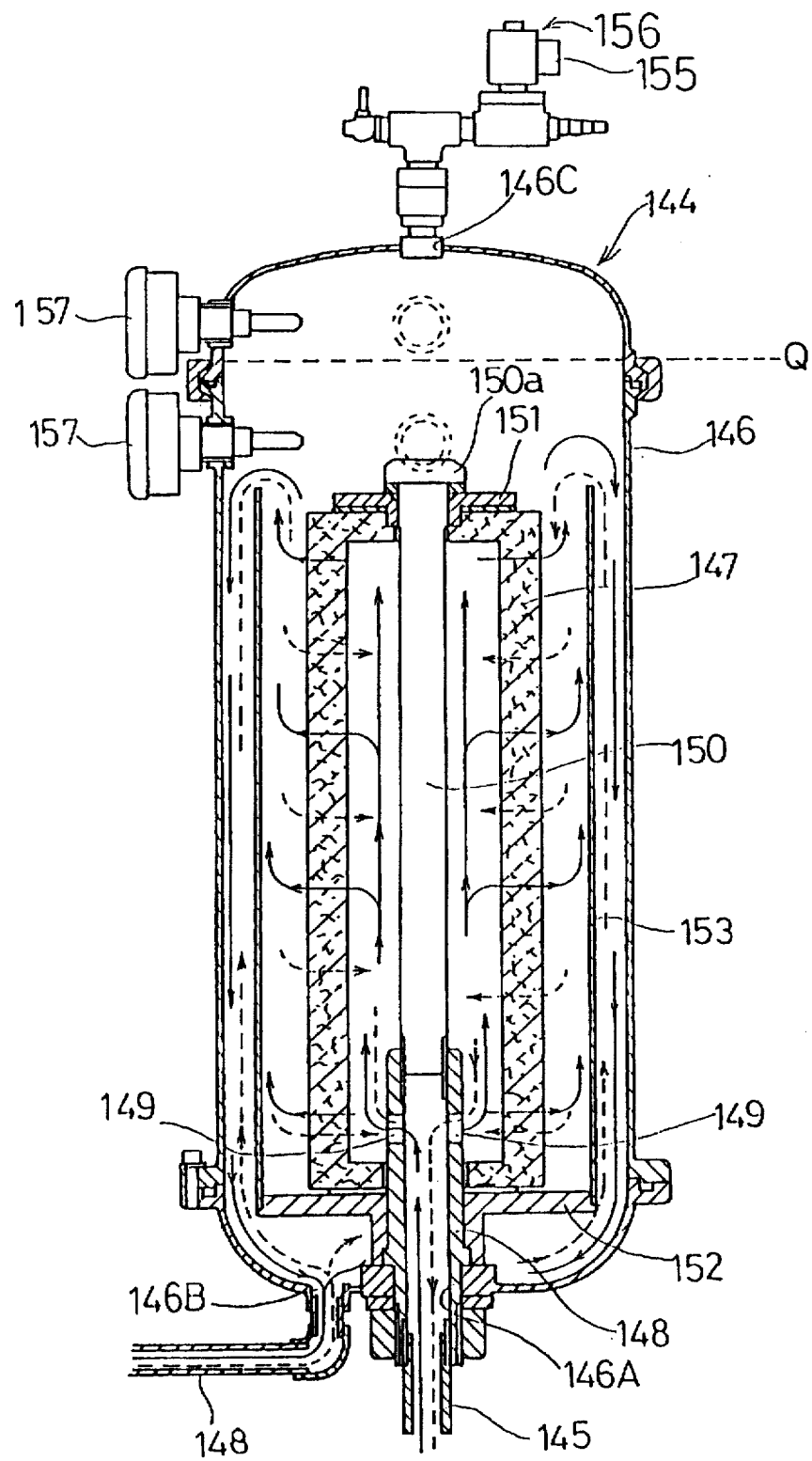
FIG. 10 is a vertical sectional view of the oily water separation device.

The construction of the oily water separation device 44A will now be explained with reference to FIG. 10. The oily water separation device 44A has a hollow cylindrical body 146. A hollow cylindrical coalescer 147 made of fibrous material such as glass wool is disposed within the cylindrical body 146 and is positioned coaxially therewith. A pipeline 145 from the filtration tube 43 is connected to an inlet 146A positioned at the lower portion of the body 146 for the oily water to be separated. The pipeline 145 is connected to a conduit 148 which is disposed within the lower portion of the body 146 and which has an upper part extending into the coalescer 147. Suitable number of radially oriented outlet holes 149 are formed in the upper portion of the conduit 148 and are equally spaced from each other in the circumferential direction, so that the washing liquid from the pipeline 45 enters the interior of the coalescer 147.

An upper end of the conduit 148 is threadably engaged with a lower end of a central shaft 150 of the coalescer 147. The central shaft 150 has an upper portion which extends through the coalescer 147 and protrudes upwardly therefrom. A head 150a having a larger diameter is formed on the upper end of the central shaft 150. A washer member 151 is interposed between the head 150a and the upper end surface of the coalescer 147. An annular flange 152 is mounted on the lower portion of the conduit 148 for supporting the lower portion of the coalescer 147, so that the coalescer 147 is held in position between the washer member 151 and the flange 152.

A suitable gap is formed between the outer peripheral portion of the flange 152 and the inner wall of the body 146, and a cylindrical partition wall 153 having an open upper end is mounted on the outer peripheral edge of the flange 152. The partition wall 153 is positioned coaxially with the coalescer 147 and suitable gaps are formed between the partition wall 153 and the outer wall of the coalescer 147 and between the partition wall 153 and the inner wall of the body 146, respectively. The height of the upper end of the partition wall 153 is determined to be substantially the same as the upper end of the coalescer 147 or to be slightly higher than the latter. With this construction, the washing liquid which is supplied from the pipeline 45 via the pipeline to enter the interior of the coalescer 147 is separated into oil components and water components while passing through the wall of the coalescer 147 from the inside thereof to the outside and then flows upwardly within the gap between the wall of the coalescer 147 and the partition wall 153 as indicated by arrows in FIG. 10. As indicated by the arrows of solid lines, the water components of the separated washing liquid flow over the upper end of the partition wall 153 and then flows downwardly within the gap between the inner wall of the body 146 and the partition wall 153 to reach the lower portion of the body 146 where the water components enter the pipeline 48 connected to an outlet 146B. The outlet 146B is disposed at the lower portion of the body 146 for the separated water components. On the other hand, the oil components are forced to be raised by the upwardly oriented flow within the gap between the wall of the coalescer 147 and the partition wall 153 so as to be effectively separated and to be accumulated on the upper portion of the body 146.

A separated-oil discharge device 156 has a solenoid valve 155 and is mounted on an outlet 146C for the separated oil components. The outlet 146C is positioned at the upper end of the body 146. Boundary surface sensors 157 and 158 are mounted on the upper portion of a side surface of the body 146 and are spaced from each other in a vertical direction. When the amount of the separated oil components accumulated on the upper portion of the body 146 has been increased, a level Q of the boundary surface between the oil components and the water components which have been separated from each other is lowered. Then the lower boundary surface sensor 158 detects the level Q to open the solenoid valve 155, so that the separated oil components are automatically discharged by the separated-oil discharge device 156. When the boundary surface level Q is lifted and is detected by the upper boundary surface sensor 157, the solenoid valve 155 is closed to automatically stop the discharge of the separated oil components.

Figure 5:
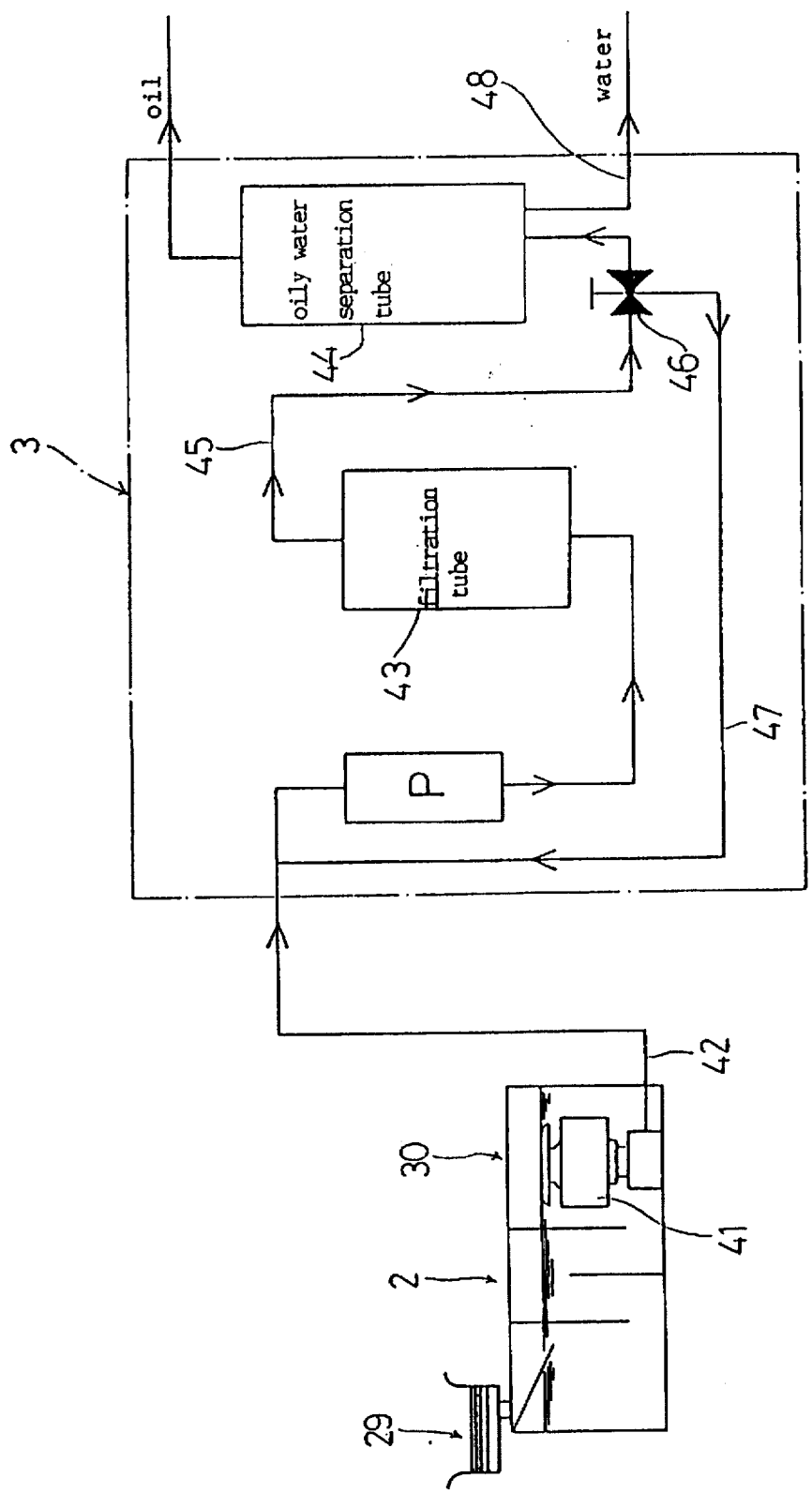
FIG. 5 is a piping diagram of a second sludge removal and oily water separation section shown in FIG. 1.
Figure 11:
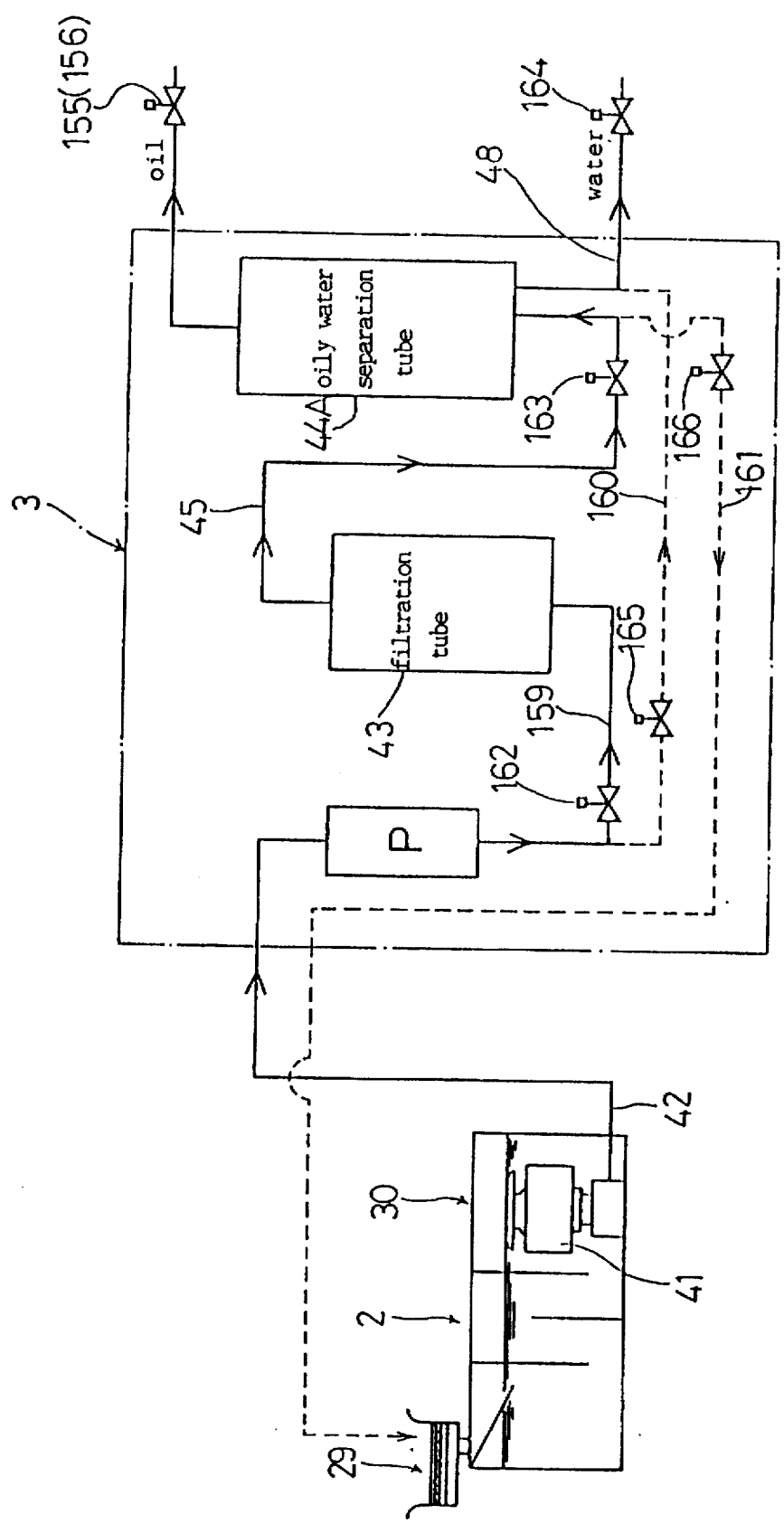
FIG. 11 is a piping diagram of a second sludge removal and oily water separation section including the oily water separation device.

FIG. 11 corresponds to FIG. 5 of the previous embodiment and shows a pipeline system of the second sludge removal and oily water separation section 3 including the oily water separation device 44A. The pipeline 42 extending from the liquid-surface absorbing device 41 of the oily water separation device 30 is connected to the filtration tube 43 via the pump through a pipeline 159, and the filtration tube 43 is connected to the oily water separation device 44A via the pipeline 45. A back-washing water supply pipeline 160 is adapted for introducing the back-washing water for the coalescer 147 of the oily water separation device 44A. The back-washing water supply pipe line 160 is connected between a part on the side of the pump P of the pipeline 159, which connects the pump P to the filtration tube 43, and an outlet portion of the pipeline 48 for discharging the separated water component. A back-washing water discharge pipeline 161 has one end connected to a part on the side of the oily water separation device 44A of the pipeline 45 between the filtration tube 43 and the oily water separation device 44A, and the back-washing water discharge pipeline 161 has the other end opened at the sludge removing device 29 of the oily water separation device 30.

A first open-close solenoid valve 162 is mounted on the pipeline 159, which connects the pump P to the filtration tube 43, at a position on the downstream side of the connecting portion of the pipeline 159 to the back-washing water supply pipeline 160. A second open-close solenoid valve 163 is mounted on the pipeline 45 which connects the filtration tube 43 to the oily water separation device 44A. A third open-close solenoid valve 164 is mounted on the pipeline 48, which is adapted for discharging the separated water components, at a position on the downstream side of the connecting portion of the pipeline 48 to the back-washing water supply pipeline 160. A fourth open-close solenoid valve 165 is mounted on the midway of the back-washing water supply pipeline 160. A fifth open-close solenoid valve 166 is mounted on the midway of the back-washing water discharge pipeline 161. A back-washing system is constituted by the pump P, the back-washing water supply pipeline 160, the back-washing water discharge pipeline 161, the first to fifth open-close solenoid valves 162 to 166 and the oily water separation tank 30. The first to fifth open-close solenoid valves 162 to 166 are controlled to be opened and closed by a control device (not shown) in response to an oily water separation operation and a back-washing operation as follows:

|  | (oily water separation operation) | (back-washing operation) |
| --- | --- | --- |
| First valve 162 | open | close |
| Second valve 163 | open | close |
| Third valve 164 | open | close |
| Fourth valve 165 | close | open |
| Fifth valve 166 | close | open |

Thus, during the back-washing operation, as indicated by the arrows of dotted lines, the washing water delivered from the liquid-surface absorbing device 41 of the oily water separation tank 30 enters the interior of the body 146 through the pipeline 48 of the oily water separation device 44A for discharging the separated water via the pump P and the back-washing water supply pipeline 160. The washing water is then flows over the partition wall 153 into the space between the partition wall 153 and the coalescer 147 and enters the interior of the coalescer 147 while passing through the coalescer 147 from the outside thereof to the inside in the opposite direction as the case of the oily water separation operation. With this back-washing operation, the emulsion-like oils absorbed onto the fibrous layer of the coalescer 147 are removed, and the washing water containing the emulsion-like oils is then discharged from the pipeline 45 to the sludge removing device 29 of the oily water separation tank 30 via the back-washing water discharge pipeline 161. The washing water subsequently receives the separation action at the oily water separation tank 30 in the same manner as described above so as to be clarified and is thereafter delivered via the back-washing water supply pipeline 160 to be used again for the back-washing operation.

By means of a timer provided in the previously described control device, the back-washing operation is automatically periodically performed for a predetermined time after the oily water separation operation has been performed for a predetermined time. For example, if a standard oily water separation operation is performed at 15 liters/min and at 70° C. of the washing water temperature by using the coalescer 47 having a diameter of 150 mm and having a vertical height of 450 mm, the separation ability can be renewed to the initial ability (the ability of separation at 15 liters/min) by performing the back-washing operation at intervals of 10 hours by using the back-washing water of 7 to 8 liters (30 seconds) to 9 to 10 liters (40 seconds). With this back-washing operation, the life of the coalescer 147 can be extended by two to three times as that resulted when the operation has been continuously performed without back-washing at 70° C. of the washing water.

The washing liquid which has received the separation action at the oily water separation device 44A for precisely removing the oil contents is returned to the bubbling vessel 7 of the bubbling section 1 via the pipeline 48. As described in the above embodiment, the oil absorption device 52 is provided on the upper portion of the bubbling vessel 7, so that the washing liquid flown out of the pipeline 48 flows downwardly into the bubbling vessel 7 via the oil absorption device 52. By virtue of the absorption mat 53 made of the non-woven fabric of polypropylene family of the oil absorption device 52, the oil contents are further removed, so that the stability in the separation accuracy can be obtained.

In this embodiment, the removal of the sludges in the washing liquid and the separation of the oily water therein can be highly accurately performed by the circulation path of the bubbling wash section 1—the first sludge removal and oily water separation section 2—the second sludge removal and oily water separation section 3—bubbling wash section 1. However, particularly when the hot water washing has been performed, due to water scales or fine residual materials such as surface active agents, pigments and iron components deposited on the work through evaporation of the water, the clarity of the washing liquid may be degraded. In such a case, the washing liquid is passed through the activated carbon filtration section 4 in the same manner as the washing apparatus of the first embodiment. Thus, the water scales or the fine residual materials are removed from the washing liquid while passing through the activated carbon layer in the activated carbon filtration section 4, and the washing water thus filtered is then returned to the bubbling vessel 7 via the pipeline 70. Here, also in this case, the activated carbon filtration section 4 is not required to be always operated but may be operated occasionally according to the clarified degree of the washing liquid.

As described above, with the oily water separation device 44A of this embodiment, the partition wall 153 is provided to coaxially surround the coalescer 147 so as to create the upwardly oriented flow in the washing liquid after separation by the coalescer 147. Therefore, the separated oil components are forced to be risen and the oil components are prevented from being mixed with the separated water components which flow toward the pipeline 48, so that the separation operation can be efficiently performed.

An additional explanation will now be made for the operation for preventing the oil contents from being mixed with the separated water components. In case of the oily water separation device described previously with reference to FIG. 7, the oil components separated while passing the separation layer A from the inside thereof to the outside accumulate at the upper portion of the separation tube depending only on its buoyancy. On the other hand, the separated water component is discharged from the lower portion of the separation tube to the outside via the water outlet 48. Therefore, in some cases, the separated fine oil particles cannot rise enough but are mixed with the water so as to be discharged from the water outlet 48 to the outside. Such mixing of the fine oil particles becomes frequent as the separation pressure increases since the flow speed of the separated water component becomes greater as the separation pressure increases. In contrast, with this embodiment, the separated oil components are positively risen by the provision of the partition wall 153, so that this embodiment serves to overcome the disadvantage of the oily water separation device of the previous embodiment by preventing the separated oil particles from being mixed with the water.

Additionally, since the height of the upper end of the partition wall 153 is determined to be substantially the same height as the upper end of the coalescer 147 or to be slightly higher than the same, the rising action of the oil components can be produced throughout the length of the coalescer 147, so that the separation accuracy can be further improved.

Further, with this embodiment, since the back-washing system is constituted by the pump P, the back-washing water supply pipeline 160, the back-washing water discharge pipe line 161, first to fifth open-close solenoid valves 162 to 166 and the oily water separation tank 30, the washing liquid is passed through the coalescer 147 in the direction opposite to the separation direction, so that the emulsion-like oils absorbed onto the fibrous layer of the coalescer 147 during a long-time separating operation can be removed. Therefore, the clogging of the fibrous layer of the coalescer 147 can be eliminated and the separating operation of the oily water can be efficiently performed.

Thus, with the oily water separation device explained previously in connection with FIG. 7, when the separating operation by means of the separation layer A is performed for a long time, the inner pressure of separation layer A increases due to the resistance of the emulsion-like oil components absorbed onto the fibrous layer. The absorbed oil components may grow up to form oil drops of about 0.1 to 0.3 $mm^3$ so as to form pores within the fibrous layers, and the oil drops consequently flow to the outside and are mixed with the separated water component. This may lower the separation accuracy and may degrade the separation efficiency, so that the coalescer A must be changed to new one. In contrast, with this embodiment, the emulsion-like oil components absorbed onto the fibrous layer can be removed by the back-washing operation, so that the above drawbacks can be overcome.

Further, with the back-washing system of this embodiment, the washing water delivered from the liquid-surface absorbing device 41 of the oily water separation tank 30 is utilized as the washing water for the back-washing operation and is returned again to the oily water separation tank 30. Therefore, this system is economical since it does not require to newly introduce the washing water for the back-washing operation. In addition, the back-washing operation can be performed by utilizing the pump P, the pipeline 45 for discharging the separated water, the outlet 146B, the pipeline 45 for supplying the oily water to be separated, and the inlet 146A which are utilized for the separation operation, so that this operation is advantages to simplify the construction. Further, with this embodiment, the back-washing operation is automatically periodically performed for a predetermined time by means of the timer of the control device after the oily water separation operation has been performed for a predetermined time. Therefore, this embodiment is advantageous in that the coalescer 147 can always maintain an excellent separation efficiency and that a longer life of the coalescer 147 can be achieved by optimally determining the material and size of the coalescer 147, the temperature of the washing water used for the back-washing operation, the back-washing pressure, etc.

Although this embodiment incorporates both the construction in which the partition wall 153 is provided and the construction in which the back-washing water supply pipeline 160, the back-washing water discharge pipeline 161 and the first to fifth open-close valves 162 to 165 are provided for the back-washing operation, each of these constructions independently serves to improve the separation efficiency, and therefore, only one of these constructions may be incorporated. However, it is a matter of course that the oily water separation efficiency can be further improved by incorporating both these constructions as in this embodiment.

Further, although this embodiment is optimally utilized for the washing apparatus of the embodiment shown in FIG. 1, it is a matter of course that this embodiment is not limited to use with the washing apparatus but can be utilized as an independent oily water separation device.

A filtration device which can be optimally used as the activated carbon filtration section 4 explained in connection with the washing apparatus of the first embodiment will now be explained with reference to FIGS. 12 to 17.

Figure 13:
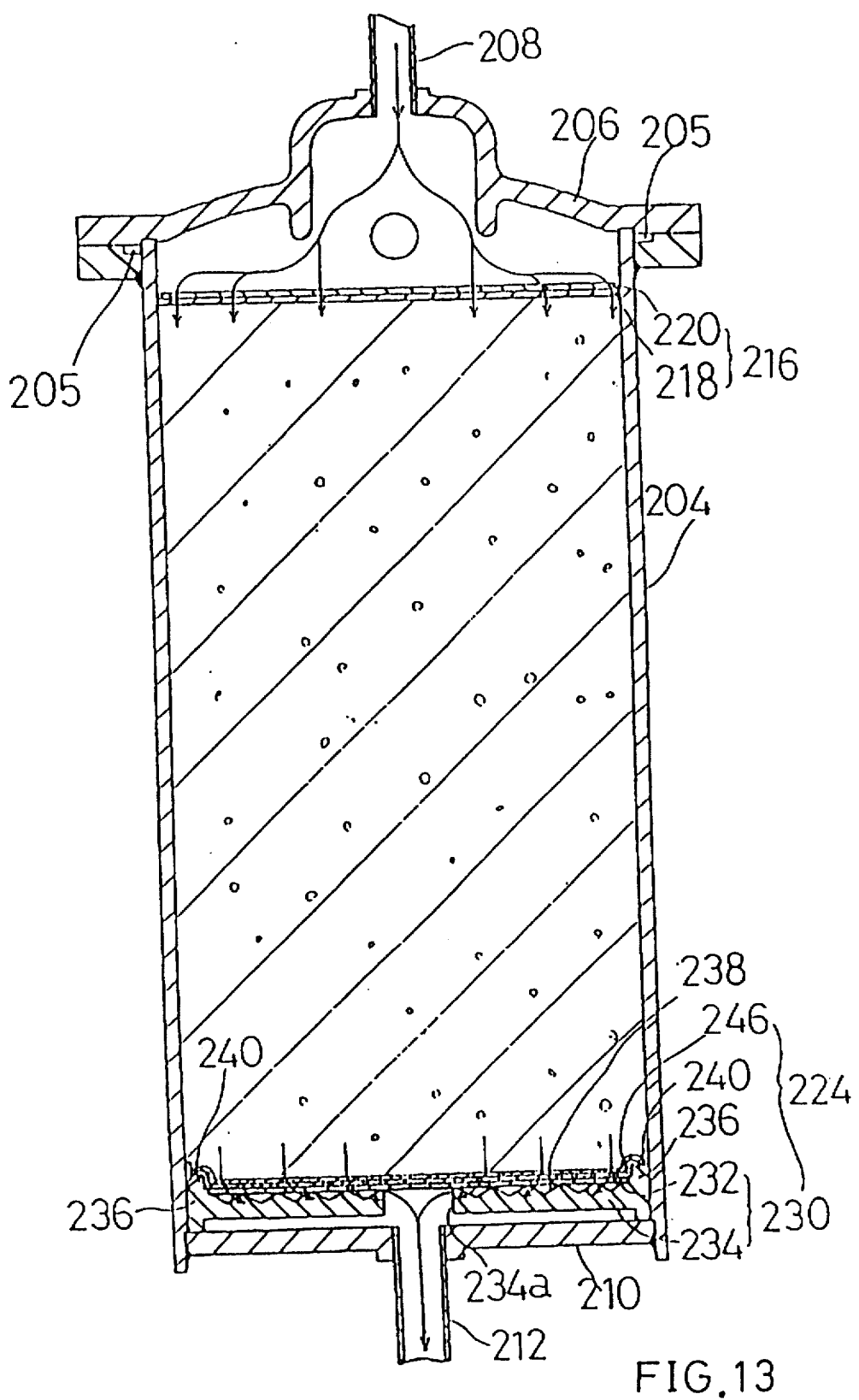
FIG. 13 is a view showing the overall filtration device.

The whole filtration device is shown by a sectional view in FIG. 13 and includes activated carbon 202 as a filtration material. Liquids to be treated are supplied from the upside of the device and filtrate liquids flow downwardly to the outside. The filtration device is constituted by a tubular body 204 filled with the activated carbon 202, a lid 206, a bottom member 210, an activated carbon presser 216 and an activated carbon support 224.

Figure 12:
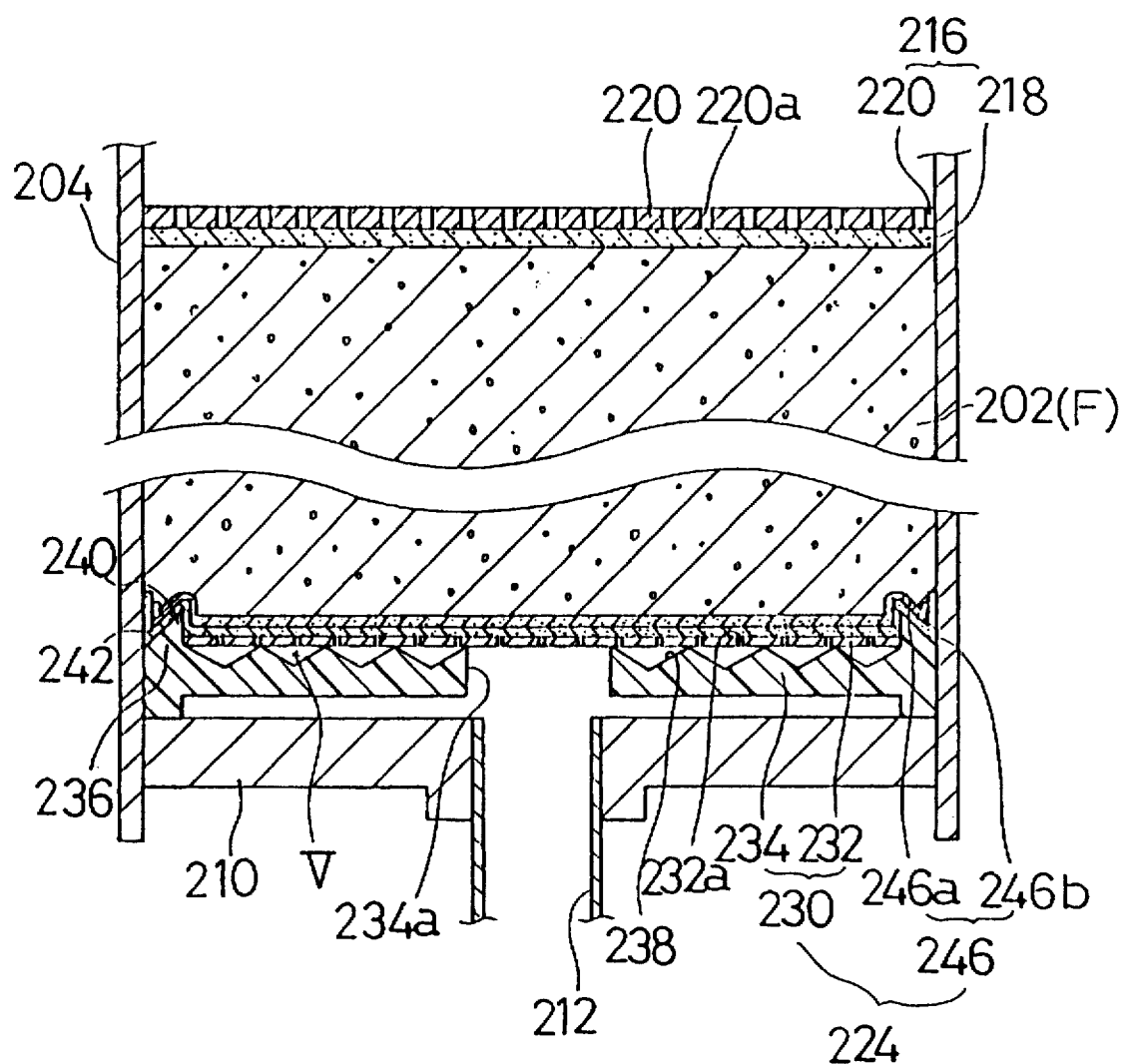
FIG. 12 is a view illustrating in detail the construction of an upper portion and a lower portion of a filtration apparatus according to an embodiment of the present invention.

Firstly, as shown in FIG. 12, the tubular body 204 is made of stainless steel and has a cylindrical configuration. The body 204 has an open top on which the lid 206 is fitted via an O-ring 205 as a packing member.

The lid 206 serves to close the open top of the body 204 and has a central portion to which a pipe 208 is connected for charging the liquids to be treated into the tubular body 204 under pressure.

The tubular body 204 has an open bottom to which the bottom member 210 is fixed by welding. The bottom member 210 serves to close the open bottom of the tubular body 204 and to support the activated carbon 202 filled within the tubular body 204, the activated carbon presser 216 and the activated carbon support 230.

A discharge pipe 12 is connected to the central portion of the bottom member 210 for discharging clarified liquids or the filtrate liquids which have been passed through the activated carbon 202.

The internal construction of the tubular body will now be explained with reference to FIGS. 12 and 13.

As shown in FIG. 13, the activated carbon 202 is uniformly filled within the tubular body 204 and forms a filtration layer F.

The activated carbon presser 216 is positioned above the filtration layer F. More specifically, in order to press the activated carbon 202, the activated carbon presser 216 is formed by a non-woven fabric 218 for abutting on the whole upper surface of the filtration layer F and a perforated plate 220 laid on the non-woven fabric 218 for preventing the non-woven fabric 218 from floating. The perforated plate 220 has water passing holes 220a formed therethrough.

The non-woven fabric 218 is selected to have a density not to permit passage of water to be treated.

In addition, the perforated plate 220 utilized in this embodiment has a weight sufficient to press the non-wove fabric 218 by its gravity.

Thus, in this embodiment, the non-woven fabric 218 is in a state compressed by the gravity of the perforated plate 220. Therefore, when the liquids to be treated are introduced and passed through the non-woven fabric 218, the resistance within the non-woven fabric 218 to prevent passage of the liquids increases, so that the liquids are dispersed over the whole non-woven fabric 218 and that the liquids may uniformly pass through the filtration layer F in section.

Although in this embodiment, the non-woven fabric 218 is compressed by the gravity of the perforated plate 220, the non-woven fabric 218 may be compressed by the perforated plate 220 with the perforated plate 220 held by a suitable holder.

The activated carbon support 224 is disposed below the filtration layer F.

The activated carbon support 224 is constituted by a filter 246 and a support 230 for supporting the filter 246. The filter 246 serves to prevent the activated carbon 202 from flowing out therethrough but not to prevent passage of the filtrate liquids.

The support 230 is formed by a plate 232 and a plate support member 234. The plate 232 has a number of water passing holes 232a formed therethrough, and the plate support member 234 serves to hold the plate 232 in a predetermined position within the tubular body.

The plate support member 234 has a substantially circular configuration and is laid on the bottom member 210. A hole 234a is formed through the central portion of the plate support member 234 for introducing the filtrate water to the discharge pipe. A vertical wall 236 is formed on the outer periphery of the plate support member 234 and extends along the inner peripheral surface of the tubular body.

The plate support member 234 has an upper surface (hereinafter called "filtrate liquid passing portion) 238 positioned inwardly of the vertical wall 236. A plurality of grooves V are formed on the filtrate liquid passing portion 238 along the radial direction thereof, so that the plate 232 is supported by apexes of the grooves V at their corresponding positions and that the bottoms of the grooves V form passages for the filtrate liquids. The filtrate liquids are therefore discharged from the central hole 234a through the filtrate liquid passing portion 238.

The vertical wall 236 of the plate support member 234 is formed like a stepped portion extending upwardly along the outer peripheral edge of the filtrate liquid passing portion 238 and includes a protrusion part 240 oriented upwardly of the tubular body 204 and toward the center of the tubular body 204. The protrusion part 240 has a ring-like configuration and extends along the inner peripheral surface of the tubular body 4.

More specifically, the protrusion part 240 is formed on the vertical wall 235 on the side of the center of the tubular body and protrudes upwardly at an angle of about 45°, so that a substantially V-shaped filter groove 242 is formed between the protrusion part 240 and the inner peripheral surface of the tubular body 204.

The plate 232 is placed on the upper side of the filtrate liquid passing portion 238 of the plate support 234 thus constructed.

The plate 232 having the water passing holes 232a is a circular perforated plate made of stainless steel and having a diameter smaller than the inner diameter of the tubular body 204. The plate 232 is laid on the filtrate liquid passing portion 238 and is held in position relative to the tubular body with its outer periphery surrounded by the vertical wall 236.

Thus, the vertical wall 236 on the side of outer periphery of the plate 232 forms a filtration stopper portion for stopping the passage of the filtrate liquids.

In this embodiment, the filter 246 laid on the plate 232 includes two non-woven fabrics or upper and lower non-woven fabrics 246a and 246b.

Further, in this embodiment, a non-woven fabric having a predetermined density is utilized as each of the non-woven fabrics 246a and 246b, and the non-woven fabric 246b on the lower layer side has a circular configuration having a diameter larger than the inner diameter of the tubular body 204 by 5%, while the non-woven fabric 246a on the upper layer side has a circular configuration having a diameter substantially equal to the inner diameter of the tubular body 204.

The filter 246 is adapted to also cover the inner peripheral surface of the tubular body 204 as well as the protrusion part 240 forming the filter groove 242. In view of the displacement of the non-woven fabrics 246a and 246b when the activated carbon is charged, and in view of the configurations of the protrusion part 240 and the filter groove 242, the size of each of the non-woven fabrics 246a and 246b must be determined and the construction of the filter 246 must be determined as to whether it may have one-sheet construction.

As shown in FIG. 12, in this embodiment, the non-woven fabric 246b on the lower layer side covers the upper surface of the plate 232 and also covers the filter groove 242 by its outer peripheral portion such that the outer peripheral portion extends like a vertical wall closely fitted on the inner peripheral surface of the tubular body.

In this connection, with this embodiment, the height of the non-woven fabric 246b which acts as a vertical wall for covering the inner peripheral surface 204 of the tubular body 204 is substantially equal to the height of the non-woven fabric 246a for covering the plate 232. As the result, the covering operation by the non-woven fabric 246a can be easily made, and the non-woven fabrics 246a and 246b are compressed by the charged activated carbon without causing the non-woven fabric 246b to be bent inwardly when the activated carbon has been charged.

The non-woven fabric 246a on the upper layer side is spread over the non-woven fabric 246b on the lower layer side such that the non-woven fabric 246a covers the plate 232 and the protrusion part 240 and that it abuts on the corner of the filter groove 242 which is covered by the non-woven fabric 246b.

As the result, the filter groove 242 is covered by the non-woven fabric 246b along the contour of the filter groove 242 and substantially half the filter groove 242 covered by the non-woven fabric 246b is further covered by the non-woven fabric 246a on the upper layer side, so that the filter 246 as a whole covers the filter groove 242 and is filled into the same.

The non-woven fabrics 246a and 246b is positioned during the charging of the activated carbon such that two non-woven fabrics 246a and 246b are pressed by the activated carbon not to produce any gap therebetween and that the non-woven fabrics 246a and 246b are pressed into the filter groove 242 by the activated carbon 202.

The operation of the above filtration device will now be explained.

Firstly, when the liquids to be treated or the polluted liquids are introduced into the filtration device, the polluted liquids reach the activated carbon presser 216 at the upper portion of the tubular body 204 via the pressure-charging pipe 208.

At the activated carbon presser 216, the polluted liquids are diffused in a horizontal direction as well as in a downward direction within the non-woven fabric 218 which has been pressed by the perforated plate 220 and which has been compressed, so that the liquids uniformly diffuse the overall section of the filtration layer F.

At the filtration layer F, the polluted liquids pass through the uniformly charged activated carbon 202, and due to the pressure of the passing polluted liquids, fine particles of the activated carbon are gradually moved toward the lower portion of the tubular body 204.

Most of the fine particles are captured by the non-woven fabrics 246a and 246b which are placed on the plate 232 of the activated carbon support 224.

Further, the fine particles which may pass an area along the inner peripheral surface of the tubular body 204 are also captured by the non-woven fabrics 246a and 246b which cover the filter groove 242 and extend to the inner peripheral surface of the tubular body 204.

Particularly with this embodiment, the non-woven fabric 246b at the filter groove 242 completely reaches the inner peripheral surface of the tubular body 204 by the vertical wall, and the non-woven fabric 246a is spread over this place, so that the fine particles can be reliably captured.

As described above, with this embodiment, the filter groove 242 is disposed along the inner peripheral surface of the tubular body 204, and the filter groove 242 is covered by the non-woven fabrics 246a and 246b, so that the fine particles can be reliably prevented from flowing out through a gap which would not be created between the inner peripheral surface of the tubular body 204 and the filter 246.

In contrast, as shown in FIG. 13, a conventional activated carbon filtration device has a construction in which a non-woven fabric 310 as a filtration material stopper has a size substantially equal to the internal section of a tubular body 300. The non-woven fabric 310 is disposed within a lower portion of the tubular body 300 and is supported by a perforated plate 320 and a filtration material support member 330. With this construction, a gap S may possibly be created between the non-woven fabric 310 and the inner peripheral surface of the tubular body 300. If such a gap has been created, filtrate liquids may flow through the gap between the filtration material support member 330 and the inner peripheral surface of the tubular body 300 as well as through water passing holes formed in the perforated plate 320. Further, when the water is filtered for the first time after charging the filtration material or when the filtration process is again started after the process has been once stopped, the pressure may be abruptly applied to the activated carbon within the tubular body. For this reason, fine particles contained in the charged activated carbon may move along the inner peripheral surface of the tubular body 300. In this occasion, if the gap S has been created between the non-woven fabric 310 and the tubular body 300 as described above, the fine particles are moved to flow together with the filtrate liquids along the inner peripheral surface of the tubular body 300 or through the perforated plate 320 via the gap S, so that the fine particles of the activated carbon are inconveniently mixed with the filtrate liquids immediately after starting the filtration operation.

According to the above embodiment, these drawbacks of the conventional activated carbon filtration device can be completely overcome.

Although in the above embodiment, the filter grove 242 is covered by two sheets of overlaid non-woven fabrics, the present invention is not limited to this construction.

Further, although in this embodiment, the filter groove 242 is formed as a groove between the protrusion part 240 of the vertical wall 236 at the outer periphery of the plate support 234 and the inner peripheral surface of the tubular body, the present invention is not limited to this construction.

Figure 14:
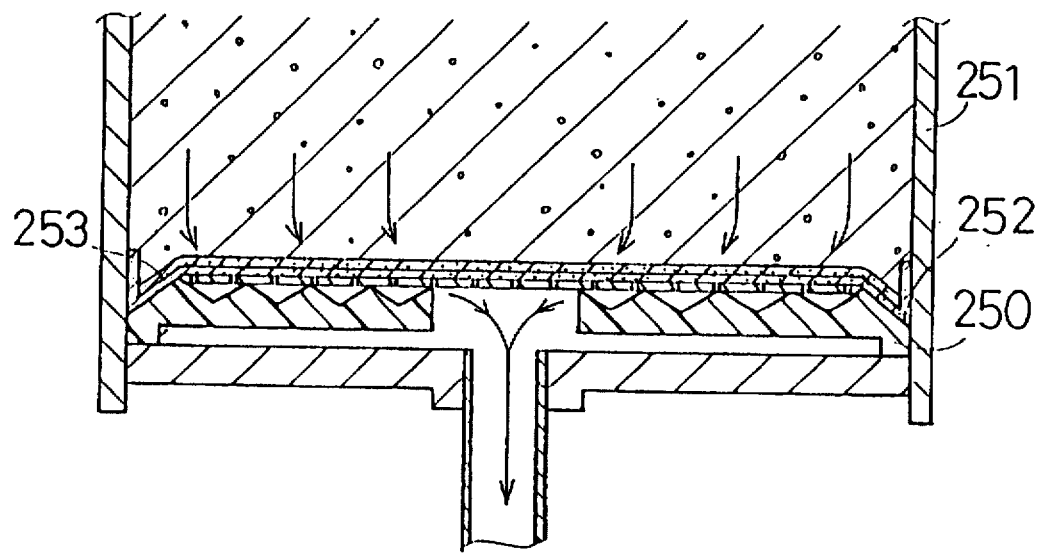
FIG. 14 is a view showing another embodiment of a filtration material receiving portion.

For example, as shown in FIG. 14, a plate support 250 may have an outer periphery which does not include a vertical wall but is merely downwardly inclined toward the inner peripheral surface of a tubular body 251, so that a filter groove 252 is formed between the inclined portion and the inner peripheral surface of the tubular body 251.

Preferably in this case, a filter 253 which is spread to form a vertical wall along the inner peripheral surface of the tubular body 251 has a height equal to or greater than the height of the plate, so that the filter 253 is formed with a grooved configuration along the filter groove 252. With such a grooved configuration, an additional filter can be easily overlaid, and the filter 253 can be reliably closely fitted on the inner peripheral surface of the tubular body 251 when the activated carbon has been charged.

Figure 15:
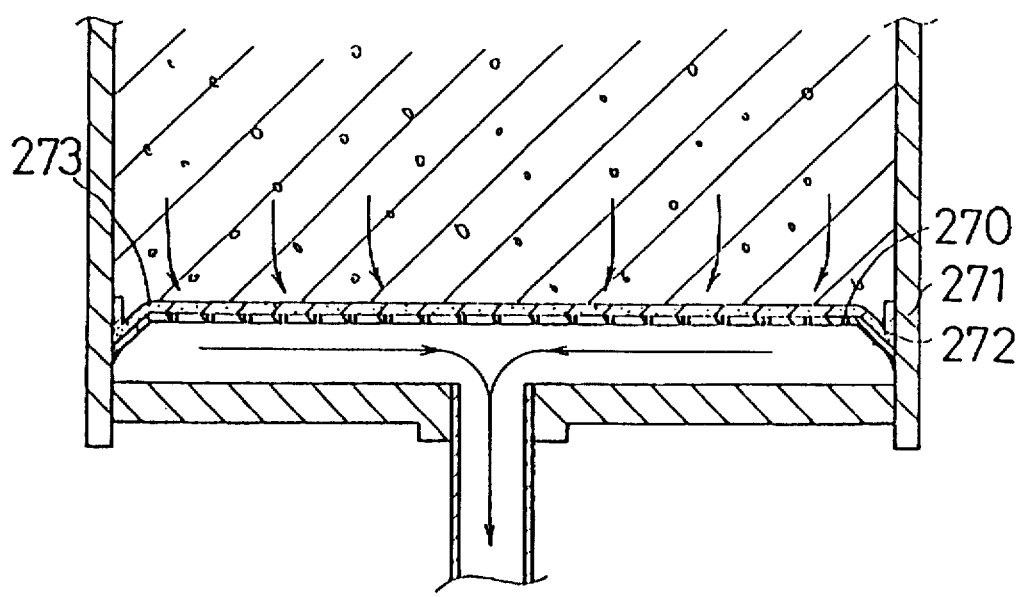
FIG. 15 is a view showing a further embodiment of the filtration material receiving portion.
Figure 18:
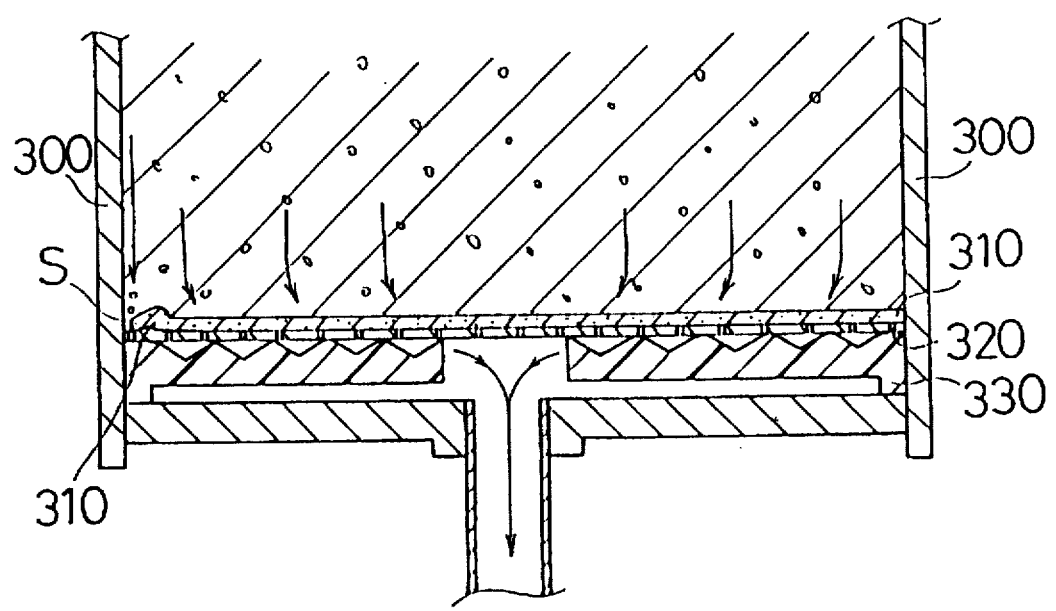
FIG. 18 is a view showing the construction of a lower portion of the conventional filtration device.

Additionally, as shown in FIG. 15, the plate and the plate support may be formed not to be separated from each other but is formed integrally as a support member 270, and the outer periphery of the support member 270 is inclined downwardly and toward the inner peripheral surface of a tubular body 271 so as to form a filtration stopper portion, so that a filter groove 272 is formed between the outer periphery of the support member 270 and the inner peripheral surface of the tubular body and is covered by the filter 273.

Of course, the filtration device of the above embodiment is not limited to the use as one of components of the washing apparatus but may be independently utilized.

Further, although the non-woven fabrics 246a and 246b are pressed into the filter groove 242 by the gravity of the activated carbon 202 as described above, it is preferable that the non-woven fabrics 246a and 246b are accurately positioned relative to the filter groove 242 at the bottom of the tubular body 204 prior to the pressing operation by the activated carbon 202 or prior to charging the activated carbon 202. An embodiment optimum for such positioning will now be explained with reference to FIG. 16, and FIGS. 17(a) to 17(c). The construction other than that shown in these drawings are the same as the embodiment shown in FIGS. 12 and 13.

In the embodiment shown in FIG. 16, similar to the embodiment shown in FIG. 12, between a flange portion 352 formed on the outer periphery of the upper end of the tubular body 204 and a flange portion 352 of a lid 356 confronting the flange portion 352, an O-ring 353 is interposed for sealing therebetween. An annular recess 354 for receiving the O-ring 353 is formed in the inner periphery of the upper surface of the flange portion 351 positioned at the upper end of the tubular body 204. The lid 156 is detachable from the tubular body 204 by means of bolts 356a. Here, the height of an upper edge 204a of the tubular body 204 is determined to be substantially the same as the height of the bottom surface of the annular recess 354, and the diameter of the outer periphery of the annular recess 354 is determined to be substantially the same as the diameter of the non-woven fabric 246b which is the lower layer side of the lower non-woven fabrics 246a and 246b, so that the diameter of the outer periphery of the annular recess 354 is greater than the inner diameter of the tubular body 204 by 5%. The diameter of the non-woven fabric 246a on the upper layer side is determined to be substantially equal to, the inner diameter of the tubular body 204 as describe previously.

FIG. 16 shows the state where the activated carbon 202 has been charged and where the upper non-woven fabric 218 has been placed on the activated carbon 202. A non-woven fabric compressing plate 355 is placed on the upper non-woven fabric 218 and has water passing holes (not shown) for permitting passage of the liquids to be treated in the same manner as the perforated plate 220 of the first embodiment. Here, the diameter of the upper non-woven fabric 218 is determined to be substantially equal to the diameter of the inner diameter of the tubular body 204, while the diameter of the non-woven fabric compressing plate 355 is determined to be slightly smaller than the inner diameter of the tubular body 204.

As shown in FIG. 16, the non-woven fabric compressing plate 355 is adapted to press the activated carbon 202 through the non-woven fabric 218. The non-woven fabric compressing plate 355 is also adapted to cooperate, prior to charging the activated carbon 202, with the annular recess 354 of the flange portion 351 at the upper end of the tubular body 204, so that particularly the non-woven fabric 246b which is one having a larger diameter and which is positioned on the lower layer side of the non-woven fabrics 246a and 246b can be accurately positioned at the bottom of the tubular body 204 relative to the filter groove 242. Such an operation will now be explained with reference to FIGS. 17(a) to 17(c).

FIGS. 17(a) to 17(c) are explanatory views showing in sequence the operation for placing the lower non-woven fabrics 246a and 246b on the bottom of the tubular body 204 prior to charging the activated carbon 202 into the tubular body 204. As shown in FIGS. 17(a) to 17(c), the filtration device is prepared in the state where the lid 358 is removed and the O-ring 353 is removed.

Prior to inserting the non-woven fabric 246b into the tubular body 204, the non-woven fabric 246b is positioned in the state where its peripheral portion is fitted into the annular recess 354 of the flange 351 at the upper end of the tubular body 204 as shown in FIG. 17(a). Since the outer diameter of the annular recess 354 is determined to be substantially equal to the diameter of the non-woven fabric 246b as described above, the non-woven fabric 246b is held in position with its center being in coincident with the center of the tubular wall 204. In this state, the non-woven fabric 246b has not yet been compressed and has a relatively greater thickness.

Next, the non-woven fabric compressing plate 355 is placed on the non-woven fabric 246b. Since the diameter of the non-woven fabric compressing plate 355 is determined to be smaller than the inner diameter of the tubular body 204, as indicated by phantom line in FIG. 17 (a), the central portion of the non-woven fabric 246b naturally falls down into the tubular body 204, while the peripheral portion of the non-woven fabric 246b which does not contact the non-woven fabric compressing plate 355 is bent upwardly.

When the non-woven fabric compressing plate 355 is pressed downwardly in this state, the non-woven fabric 246b goes downwardly with its peripheral portion bent upwardly along the inner wall of the tubular body 204 through the gap produced between the non-woven fabric compressing plate 355 and the inner wall of the tubular body 204 as shown in FIG. 17(b).

The downward movement of the non-woven fabric compressing plate 355 is stopped when the non-woven fabric 246b abuts on the protrusion part 240 of the plate support 234 as shown in FIG. 17(c). Thus, the non-woven fabric 246b is positioned at the bottom of the tubular body 204 with its center being in accurately coincident with the center of the tubular body 204, so that it can be accurately positioned relative to the filter groove 242.

After the non-woven fabric 246b has been placed on the bottom of the tubular body 204 as described above, the non-woven fabric compressing plate 355 is removed from the tubular body 204, and the non-woven fabric 246a on the upper layer side is then inserted into the tubular body 204. Since the diameter of the non-woven fabric 246a is determined to be substantially equal to the inner diameter of the tubular body 204, the non-woven fabric 246a may fall to reach the bottom of the tubular body 204 by its gravity without aid of the non-woven fabric compressing plate 355 and may be placed on the non-woven fabric 246a with its center being naturally in coincident with the center of the tubular body 204.

When the activated carbon 202 is charged into the tubular body 204 in the state where the non-woven fabrics 246b and 246a are placed on the bottom as described above, the peripheral portions of the non-woven fabrics 246b and 246a are pressed into the filter groove 242 by the gravity of the activated carbon 202.

After the activated carbon has been thus charged, the upper non-woven fabric 218 is placed on the layer F of the activated carbon 202, and the non-woven fabric compressing plate 355 is then placed on the upper non-woven fabric 218. Thereafter, the O-ring 353 is fitted into the annular recess 354, and the lid 356 is mounted, so that the state shown in FIG. 16 can be realized.

As described above, with this embodiment, the annular recess 353 for fitting the O-ring 353 therein is utilized to position the non-woven fabric 246b, and the non-woven fabric 246b is placed on the bottom of the tubular body 204 with its center being in accurately coincident with the center of the tubular body 204, so that this embodiment is advantageous in that the fitting operation of the non-woven fabric 246b can be easily performed and that the subsequent operation for pressing the non-woven fabric 246b into the filter groove 242 by the gravity of the activated carbon 202 can be reliably performed. Thus, the flowing-out of the fine particles of the activated carbon can be further reliably prevented.

While the invention has been described with reference to preferred embodiments thereof, it is to be understood that modifications or variations may be easily made without departing from the spirit of this invention which is defined by the appended claims.

I claim:

1. An oily water separation device comprising a body having an inlet of oily water to be separated, and an oil outlet and a water outlet disposed on an upper side and a lower side of said body for discharging the oils and the water after separation, respectively, a hollow coalescer having therein an oily water passage connected to said inlet of the oily water to be separated, and a separated oil and water passage disposed between said coalescer and a wall part of said body and in communication with said oil outlet and said water outlet, so that the oily water which enters at said inlet into said oily water passage of said coalescer is separated into oil components and water components through a wall of said coalescer, wherein a back-washing device is provided for introducing washing liquid into said separated oil and water passage, and passing the liquid through said coalescer in a direction opposite to the direction for separation of the oily water, and thereafter discharging the washing liquid to the outside of said body via said oily water passage, said back-washing device including a back-washing water supply pipe connected to said water outlet of said body, and a back-washing water discharge pipe connected to said inlet of the oily water, said back-washing water supply pipe being connected to an outlet side of a separate oily water separation tank and said back-washing water discharging pipe being connected to an inlet side of said oily water separation tank, so that the washing liquid used for back-washing is separated into oil components and water component at said oily water separation tank and is circulated for again back-washing said coalescer during a back-washing operation, wherein said oily water separation tank is upstream from said coalescer for pre-separation of the oily water before separation at said coalescer during an oily water separation operation.

2. The oily water separation device as defined in claim 1, wherein a partition wall is provided in said separated oil and water passage for producing a rising flow of the oil components and the water components separated by said coalescer.

3. The oily water separation device as defined in claim 2 wherein said partition wall has a substantially cylindrical configuration surrounding said coalescer and has an upper end determined at substantially the same height as an upper end of said coalescer.

4. The oily water separation device as defined in claim 1, wherein said oily water separation tank is adapted to receive the oily water from a washing section disposed on the upstream side thereof.

5. The oily water separation device as defined in claim 1, wherein an oily water supply pipe is connected between said outlet side of said oily water separation tank and said inlet of the oily water of said body, said back-washing water supply pipe has a pipe part extending from said outlet side of said water separation tank and including said pump, said pipe part also forming a part of said oily water supply pipe, so that said oily water supply pipe branches from said back-washing water supply pipe, and wherein said back-washing water supply pipe and said oily water supply pipe have control valves which are controlled to be opened and closed, respectively, according to change between the oily water separation operation and the back-washing operation.

6. The oily water separation device as defined in claim 1, wherein said oily water separation tank is divided into a plurality of sections for providing alternative overflow and underflow of the oily water or the back-washing water to be separated.

7. The oily water separation device as defined in claim 6, further including a sludge removing device which serves to remove sludges, prior to separation at said oily water separation tank, from the back-washing water which has been used for back-washing said coalescer.

* * * * *